United States Patent
Suzuki et al.

(10) Patent No.: US 9,131,148 B2
(45) Date of Patent: Sep. 8, 2015

(54) IMAGE PROCESSING DEVICE, METHOD OF CONTROLLING IMAGE PROCESSING DEVICE AND PROGRAM CAUSING COMPUTER TO EXECUTE THE METHOD

(75) Inventors: Naho Suzuki, Tokyo (JP); Takeshi Harano, Ibaraki (JP)

(73) Assignee: SONY CORPORATION, Tokyo (JP)

( * ) Notice: Subject to any disclaimer, the term of this patent is extended or adjusted under 35 U.S.C. 154(b) by 141 days.

(21) Appl. No.: 13/589,561

(22) Filed: Aug. 20, 2012

(65) Prior Publication Data

US 2013/0070116 A1 Mar. 21, 2013

(30) Foreign Application Priority Data

Sep. 20, 2011 (JP) ................... 2011-204032

(51) Int. Cl.
*H04N 5/232* (2006.01)
*G06K 9/00* (2006.01)
(52) U.S. Cl.
CPC ........ *H04N 5/23219* (2013.01); *G06K 9/00684* (2013.01)
(58) Field of Classification Search
CPC ........... H04N 5/23212; H04N 5/23219; G02B 7/102; G06K 9/00684
USPC ...................... 348/222.1, 354–356
See application file for complete search history.

(56) References Cited

U.S. PATENT DOCUMENTS

| | | | |
|---|---|---|---|
| 2003/0218696 A1 | 11/2003 | Bagga et al. | |
| 2006/0239558 A1* | 10/2006 | Rafii et al. | 382/181 |
| 2009/0059061 A1* | 3/2009 | Yu et al. | 348/347 |
| 2009/0196492 A1* | 8/2009 | Jung et al. | 382/154 |
| 2010/0020191 A1* | 1/2010 | Sugimoto | 348/222.1 |
| 2012/0057067 A1* | 3/2012 | Lee | 348/345 |
| 2012/0076361 A1* | 3/2012 | Fujiyoshi | 382/103 |

FOREIGN PATENT DOCUMENTS

| | | |
|---|---|---|
| JP | 2006-244424 A | 9/2006 |
| JP | 2008-244997 | 10/2008 |
| JP | 2010-154306 | 7/2010 |

OTHER PUBLICATIONS

Office Action issued Jun. 16, 2015 to Japanese Patent Application No. 2011-204032.

\* cited by examiner

*Primary Examiner* — Mekonnen Dagnew
(74) *Attorney, Agent, or Firm* — Oblon, McClelland, Maier & Neustadt, L.L.P.

(57) ABSTRACT

There is provided an image processing device including an image acquisition part acquiring an image; a depth acquisition part acquiring a depth in association with a pixel included in the image; a target object detection part detecting a region of a predetermined target object in the image; a target object detection distance selection part selecting the depth corresponding to the pixel included in the detected region as a target object detection distance; a local maximum distance selection part selecting the depth having a local maximum frequency in a frequency distribution of the depths as a local maximum distance; and a determination part determining whether the image is a target object image obtained by shooting the target object depending on whether a degree of closeness between a value of the target object detection distance and a value of the local maximum distance is higher than a predetermined value.

12 Claims, 26 Drawing Sheets

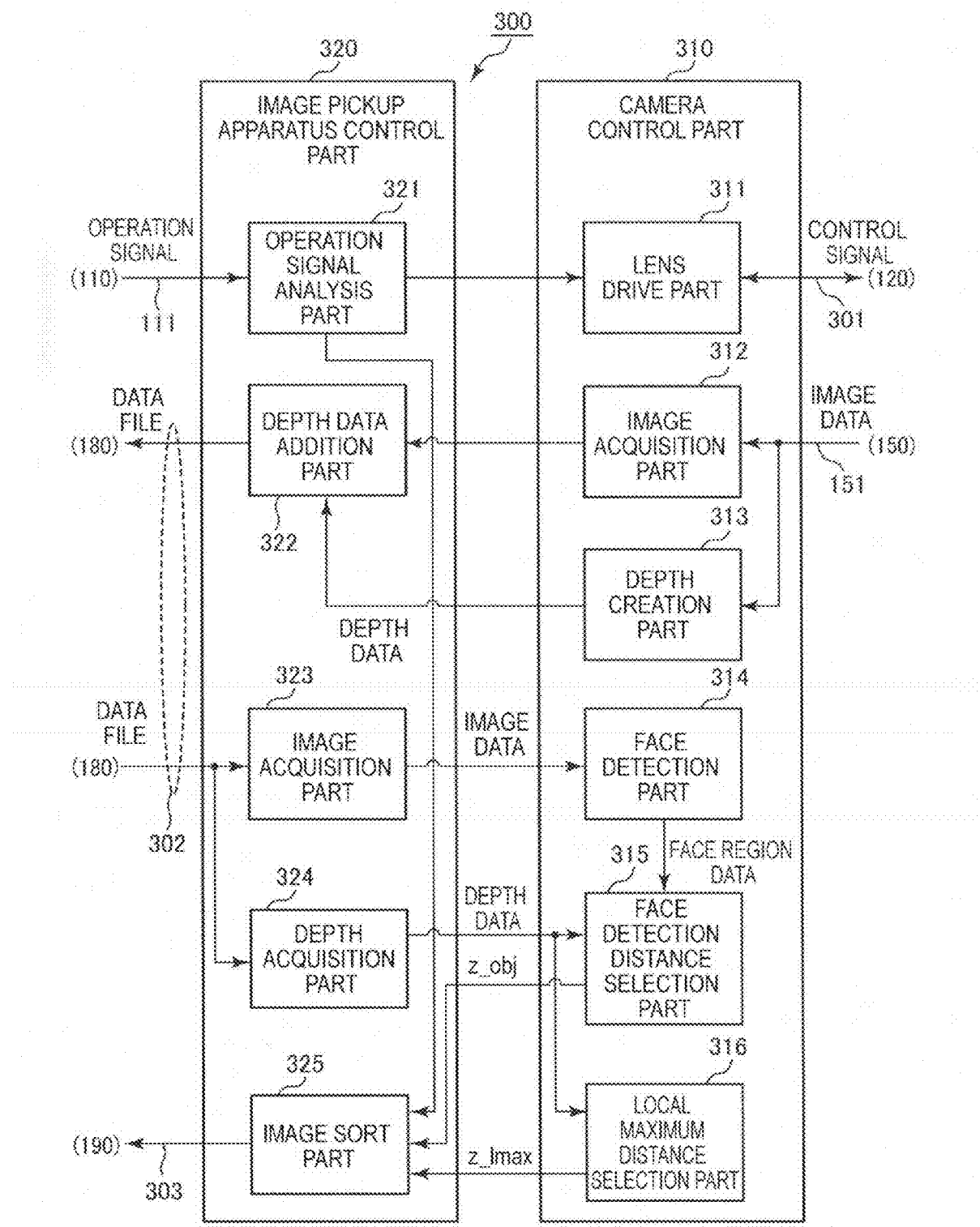

FIG. 3

DATA FILE STRUCTURE

| SOI | COMPRESSED DATA START |
|---|---|
| APP1 | APPLICATION MARKER SEGMENT 1 |
| (APP2) | (APPLICATION MARKER SEGMENT 2) |
| DQT | QUANTIZATION TABLE |
| DHT | HUFFMAN TABLE |
| (DRI) | (RESTART INTERVAL) |
| SOF | FRAME HEADER |
| SOS | SCAN HEADER |
| | COMPRESSED DATA (PRINCIPAL IMAGE) |
| EOI | COMPRESSED DATA END |
| | DEPTH DATA |

APP1 STRUCTURE

| APP1Marker |
|---|
| APP1 Length |
| Exif IDENTIFIER CODE |
| TIFF Header |
| 0th IFD |
| 0th IFD Value |
| 1st IFD |
| 1st IFD Value |
| 1st IFD IMAGE DATA |

# IMAGE PROCESSING DEVICE, METHOD OF CONTROLLING IMAGE PROCESSING DEVICE AND PROGRAM CAUSING COMPUTER TO EXECUTE THE METHOD

BACKGROUND

The present disclosure relates to an image processing device, a method of controlling the image processing device and a program causing a computer to execute the method, and particularly to an image processing device, a method of controlling the image processing device and a program causing a computer to execute the method sorting an image based on a depth.

In recent years, an image pickup apparatus capable of measuring a depth to a subject during shooting an image becomes popular. An image processing device performs processing such as acquiring an image and a depth shot by the image pickup apparatus, and sorting the image based on the depth.

For example, a sorting apparatus is disclosed that creates a depth distribution and sorts an image depending on a result of comparison between depth dispersion in the distribution and a threshold value (e.g., Japanese Patent Laid-Open No. 2006-244424). This sorting apparatus sorts a sorting target image, in the case where the depth dispersion is smaller than the threshold value, into a long-shot image obtained by shooting a distant view. On the other hand, the sorting apparatus sorts a sorting target image, in the case where the depth dispersion is larger than the threshold value, into a target-shot image obtained by shooting an object such as a building.

SUMMARY

However, the above-described sorting apparatus is likely to be unable to definitely sort an image. For example, because the depth dispersion is small in the case where a surface of an object shot in an image occupies a wide area and uniform, though the object is shot, the image is sorted into the image obtained by shooting the landscape. Further, because the depth dispersion is large in the case where the object such as a human being and a building occupies a certain portion of the image of the landscape, though the landscape is shot, the image is sorted into the image obtained by shooting the object.

In view of the above-described problem, it is desirable to provide an image processing device that definitely sorts an image based on a depth.

According to an embodiment of the present disclosure, there are provided an image processing device, a control method of the image processing device and a program causing a computer to execute the method, the device includes an image acquisition part acquiring an image, a depth acquisition part acquiring a depth in association with a pixel included in the image; a target object detection part detecting a region of a predetermined target object in the image; a target object detection distance selection part selecting the depth corresponding to the pixel included in the detected region as a target object detection distance; a local maximum distance selection part selecting the depth having a local maximum frequency in a frequency distribution of the depths as a local maximum distance; and a determination part determining whether the image is a target object image obtained by shooting the target object depending on whether a degree of closeness between a value of the target object detection distance and a value of the local maximum distance is higher than a predetermined value in order to solve the above-described problem. Accordingly, an effect is provided in which whether the image is the target object image is determined depending on whether the degree of closeness between the value of the target object detection distance and the value of the local maximum distance is higher than the predetermined value.

According to the above embodiment of the present disclosure, the target object detection part may detect a face region of a person as the region of the target object, and the determination part may determine that the image is a person image obtained by shooting the person in the case where the degree of closeness is higher than the predetermined value. Accordingly, an effect is provided in which the face region of the person is detected and the image is determined as the person image in the case where the degree of closeness is higher than the predetermined value.

According to the above embodiment of the present disclosure, the determination part may determine, in the case of determining that the image is the person image, that the person image is a portrait image obtained by shooting a particular person when the number of the detected face regions is less than a predetermined number, and determine that the person image is a group image obtained by shooting a plurality of gathered persons when the number of the detected face regions is equal to or more than the predetermined number. Accordingly, an effect is provided in which the person image is determined as the portrait image when the number of the face regions is less than the predetermined number and determined as the group image when the number of the face regions is more than or equal to the predetermined number.

According to the above embodiment of the present disclosure, the determination part may determine that the image is the target object image in the case where the degree of closeness is higher than the predetermined value and determine that the image is a landscape image obtained by shooting a landscape in the case where the degree of closeness is equal to or lower than the predetermined value. Accordingly, an effect is provided in which the image is determined as the target object image in the case where the degree of closeness is higher than the predetermined value, and the image is determined as the landscape image in the case where the degree of closeness is equal to or lower than the predetermined value.

According to the above embodiment of the present disclosure, a recording part recording a determination result performed by the determination part in association with the image may further be included. Accordingly, an effect is provided in which the determination result is recorded in association with the image.

According to another embodiment of the present disclosure, there is provided a image processing device which includes an image acquisition part acquiring an image, a depth acquisition part acquiring a depth in association with a pixel included in the image, a target object detection part detecting a region of a predetermined target object in the image, a target object detection distance selection part selecting, in the case where the region of the target object is detected, the depth corresponding to the pixel included in the detected region as a target object detection distance, a local maximum distance selection part selecting the depth having a local maximum frequency in a frequency distribution of the depths as a local maximum distance, and a determination part determining, in the case where the target object detection distance is selected, whether the image is a target object image obtained by shooting the target object depending on whether a degree of closeness between a value of the target object detection distance and a value of the local maximum distance is higher than a predetermined value, and determining, in the case where the target object detection distance is not selected, whether the image is a macro image depending on whether a value of the local maximum distance is less than a threshold value. Accordingly, an effect is provided in which whether the image is the target object image is determined in the case where the target object distance is selected, and whether the image is the macro image is determined in the case where the target object distance is not selected.

According to the above embodiment of the present disclosure, the determination part may determine, in the case where the target object detection distance is not selected, that the image is the macro image when a hyperfocal distance of an image pickup apparatus shooting the image or the value of the local maximum distance is less than the threshold value. Accordingly, an effect is provided in which the image is determined as the macro image when the value of the hyperfocal distance or of the local maximum distance is less than the threshold value in the case where the object detection distance is not selected.

Accordingly, the present technology may have an efficient effect such that the image processing device can definitely sort the image based on the depth.

BRIEF DESCRIPTION OF THE DRAWINGS

FIG. 2 is a block diagram illustrating a configuration example of an image processing device according to the first embodiment;

FIG. 3 is a diagram illustrating an example of a data structure of a data file according to the first embodiment;

DETAILED DESCRIPTION OF THE EMBODIMENT(S)

Figure 1:
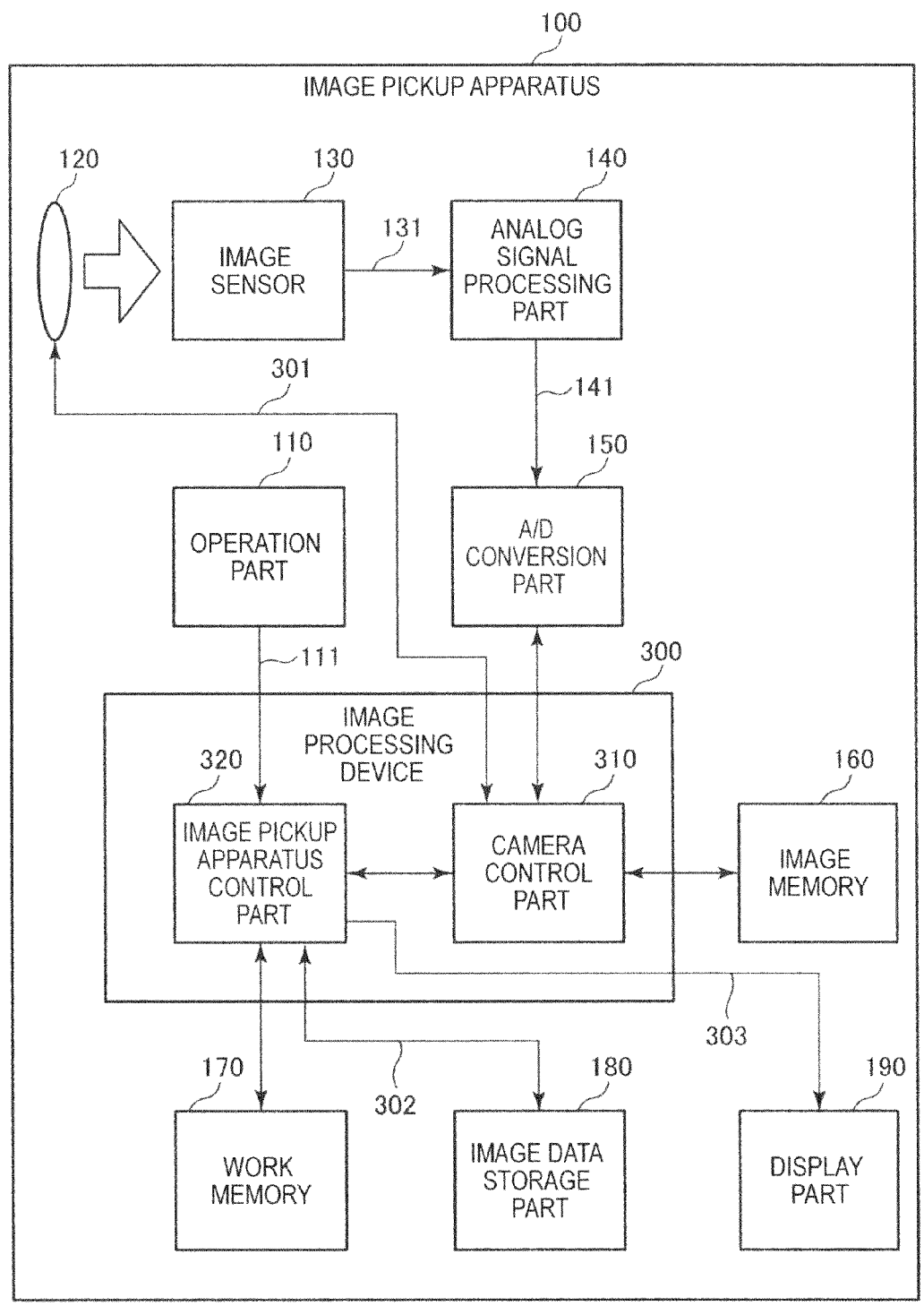
FIG. 1 is a block diagram illustrating a configuration example of an image pickup apparatus according to a first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The preferred embodiments (hereinafter referred to as embodiments) according to the present technology will be described below in the following order.

1. First Embodiment (Example of Sorting Image Based on Face Detection Distance and Local Maximum Distance)
2. Second Embodiment (Example of Sorting Image Based on Face Detection Distance and Local Maximum Distance, or Based on Local Maximum Distance)
3. Third Embodiment (Example of Adding Sorting Result to Image after Storing Image)
4. Fourth Embodiment (Example of Adding Sorting Result to Image before Storing Image)

1. First Embodiment

Image Pickup Apparatus Configuration Example

FIG. 1 is a block diagram illustrating a configuration example of an image pickup apparatus 100 according to a first embodiment. The image pickup apparatus 100 includes an operation part 110, a shooting lens 120, an image sensor 130, an analog signal processing part 140, an A/D (Analog/Digital) conversion part 150, an image memory 160 and a work memory 170. Further, the image pickup apparatus 100 includes an image data storage part 180, a display part 190 and an image processing device 300. The image processing device 300 includes a camera control part 310 and an image pickup apparatus control part 320.

The operation part 110 outputs an operation signal corresponding to a user operation on a touch panel, a button or the like to the image processing device 300 via a signal line 111. The operation will be described below in detail.

The shooting lens 120 is the lens for shooting an image. The image sensor 130 converts light from the shooting lens 120 to an electrical signal. The image sensor 130 outputs the converted electrical signal to the analog signal processing part 140 via a signal line 131. The analog signal processing part 140 performs predetermined analog signal processing on the electrical signal from the image sensor 130. The analog signal processing includes CDS (Correlated Double Sampling) to cancel an amplifier noise and a reset noise and AGC (Automatic Gain Control) to automatically control a gain. The analog signal processing part 140 outputs the electrical signal after performing the processing to the A/D conversion part 150 via a signal line 141.

The A/D conversion part 150 converts an analog electrical signal output from the analog signal processing part 140 to a digital signal. The A/D conversion part 150 outputs the converted digital signal as image data to the image processing device 300 via a signal line 151. Such image data is referred to as RAW image data because image processing such as demosaic processing or compression processing is not performed on the image data at a time point when the image data is output from the A/D conversion part 150.

The image memory 160 temporarily holds the image data. The work memory 170 temporarily holds the contents of work performed by the image pickup apparatus control part 320. The image data storage part 180 stores the image data. The display part 190 displays an image and a sorting result of an image.

The camera control part 310 performs zoom control and exposure control in accordance with control by the image pickup apparatus control part 320 to acquire image data from the A/D conversion part 150. The camera control part 310 creates a depth from the acquired image data in association with a pixel included in the image data. The depth is measured in meters (m), for example. The camera control part 310 outputs depth data including the created depth to the image pickup apparatus control part 320 together with the image data.

The camera control part 310 detects, when received the image data and the depth data from the image pickup apparatus control part 320, a face in the image data. The camera control part 310 selects a depth corresponding to a region of the detected face as a face detection distance from among the depths created for the image data. Further, the camera control part 310 creates a depth frequency distribution with respect to each piece of image data based on the depth data and selects a depth having a local maximum frequency as a local maximum distance from among the depth values in the frequency distribution. When receiving a plurality of pieces of image data from the image pickup apparatus control part 320, the camera control part 310 selects the face detection distance and the local maximum distance with respect to each piece of image data. The camera control part 310 outputs the selected face detection distance and the local maximum distance to the image pickup apparatus control part 320.

The image pickup apparatus control part 320 controls the whole of the image pickup apparatus 100. In particular, the image pickup apparatus control part 320 performs zoom control and exposure control via the camera control part 310 in response to the operation signal from the operation part 110. The image pickup apparatus control part 320 receives the image data and the depth data from the camera control part 310 and stores the depth data in the image data storage part 180 in association with the image data.

Further, the image pickup apparatus control part 320 reads out the image data and the depth data from the image data storage part 180 via a signal line 302 in response to the operation signal from the operation part 110 and outputs the image data and the depth data to the camera control part 310. When receiving the face detection distance and the local maximum distance on the image data and the depth data from the camera control part 310, the image pickup apparatus control part 320 sorts the image based on the distances. The sorting method will be described below in detail.

Image Processing Device Configuration Example

FIG. 2 is a block diagram illustrating a configuration example of the image processing device 300 according to the first embodiment. As described above, the image processing device 300 includes the camera control part 310 and the image pickup apparatus control part 320. The camera control part 310 includes a lens drive part 311, an image acquisition part 312, a depth creation part 313, a face detection part 314, a face detection distance selection part 315 and a local maximum distance selection part 316. The image pickup apparatus control part 320 includes an operation signal analysis part 321, a depth data addition part 322, an image acquisition part 323, a depth acquisition part 324 and an image sort part 325.

The operation signal analysis part 321 analyzes the operation signal from the operation part 110. A user can change a zoom magnification power, for example, by operating the operation part 110. The user can cause the image data stored in the image data storage part 180 to be read out and cause the display part 190 to display the image data by operating the operation part 110. Further, the user can designate any one of a plurality of image types and cause the image processing device 300 to search for the image data belonging to the designated image type by operating the operation part 110. For example, the image types include a person image, a landscape image and a macro image. The person image includes a portrait image and a group image. Here, the person image is the image obtained by shooting a person as a major subject. The portrait image is the person image obtained by shooting a few (e.g., less than 3 persons) specific persons as major subjects. The group image is the person image obtained by shooting a number (e.g., 3 persons or more) of gathered persons as major subjects. The landscape image is the image obtained by shooting the landscape as a major subject. The macro image is the image obtained by shooting a close-in subject as a major subject.

The lens drive part 311 controls a position of the shooting lens 120. In particular, the lens drive part 311 acquires a current position of the shooting lens 120 via a signal line 301 when receiving the changed value of the zoom magnification power from the operation signal analysis part 321. Subsequently, the lens drive part 311 outputs a control signal to control, based on the changed value of the zoom magnification power, the position of the shooting lens 120 to the shooting lens 120 via the signal line 301.

The image acquisition part 312 acquires the image data output from the A/D conversion part 150. The acquired image data is temporarily held by the image memory 160. The image acquisition part 312 outputs the acquired image data to the depth data addition part 322.

The depth creation part 313 creates a depth in association with a pixel included in the shot image data. The depth creation part 313 creates the depth by a phase difference detection method, for example. In particular, the depth creation part 313 detects a gap (phase difference) between two images of a subject separated by a separator lens and creates a distance to the subject as a depth depending on the detected phase difference. The depth creation part 313 outputs the depth created in association with the pixel to the depth data addition part 322 as depth data. Note that, the depth creation part 313 may create the depth by a method other than the phase difference detection. For example, the depth creation part 313 may irradiate laser beams on the subject and detects the reflected light of the laser beams to measure a depth based on a delay time of the detection time from the irradiation time.

The depth data addition part 322 compresses the image data output from the image acquisition part 312 appropriately and stores the depth data in association with the image data. When compressing the image data, the depth data addition part 322 performs compression in accordance with JPEG (Joint Photographic Experts Group) standards, for example. When associating the depth data, the depth data addition part 322 relates the depth data to the image data by adding the depth data to the image data as attachment information in Exif (Exchangeable image file format), for example. The depth data addition part 322 outputs the image data with the associated depth data to the image data storage part 180 as a data file.

The image acquisition part 323 acquires image data by reading out the image data stored in the image data storage part 180. The image acquisition part 323 outputs the acquired image data to the face detection part 314. The depth acquisition part 324 acquires the depth data added to the image data read out by the image acquisition part 323. The depth acquisition part 324 outputs the acquired depth data to the face detection distance selection part 315 and the local maximum distance selection part 316.

The face detection part 314 detects a region of a person face in image data. In particular, the face detection part 314 extracts a region of a subject assumed to be a face in the image data depending on a color and a shape of the subject. The face detection part 314 determines whether the region is the face region by performing matching of the region with a template image preliminarily registered in a database. The face detection part 314 outputs coordinate data of pixels in the detected face region to the face detection distance selection part 315 as face region data. Note that, the face detection part 314 is an example of a target object detection part in the appended claims of the present disclosure. The face detection part 314 may detect the face region by a method other than the above-described template matching.

The face detection distance selection part 315 selects depths corresponding to the pixels in the detected face region in the image data as a face detection distance z_obj from among the depths created on the image data. In the case where a plurality of face regions are detected from the image data, the face detection distance selection part 315 selects the face detection distance with respect to each face region. The face detection distance selection part 315 outputs the selected face detection distance z_obj to the image sort part 325. Note that, the face detection distance selection part 315 is an example of a target object detection distance selection part in the appended claims of the present disclosure.

The local maximum distance selection part 316 creates a depth frequency distribution with respect to each piece of the image data and selects the depth having the local maximum frequency in the frequency distribution as the local maximum distance z_lmax. In particular, the local maximum distance selection part 316 first counts, with respect to each value of a depth z, the number of times that the value appears in the depth data as a frequency. In the case where the value of depth z may take n (n is an integer equal to or more than 1) ways, assuming that the values are depth $z_i$ (i is an integer from 0 to n−1) and that the value of the frequency F counted for n-tuple $z_1$ is $F_i$, the frequency distribution in a range from $(z_0, F_0)$ to $(z_{n-1}, F_{n-1})$ can be obtained. For example, in the case where the frequency $F_i$ continuously increases until reaching a certain point P and the frequency $F_i$ continuously decreases after passing the point P with increase of i in this frequency distribution, the local maximum distance selection part 316 determines that the point P is a local maximum point. The local maximum distance selection part 316 selects the depth at the local maximum point P as the local maximum distance z_lmax and outputs the resultant to the image sort part 325.

Note that, the local maximum distance selection part 316 may approximate the frequency distribution by a predetermined distribution function and select the depth at a local maximum point of the distribution function as the local maximum distance. In this case, the local maximum distance selection part 316 defines the distribution function by an m-order (m is an integer more than 1) polynomial equation, for example, and calculates the order m and coefficients of the polynomial equation by a least-square method. The local maximum distance selection part 316 calculates the local maximum point by calculating a differential value of the distribution function.

The image sort part 325 determines whether an image is a person image depending on whether a degree of closeness between a value of the object detection distance z_obj and a value of a local maximum distance z_lmax is higher than a predetermined value. In particular, the image sort part 325 determines that the image is the person image when an absolute value of the difference between the value z_obj and the value z_lmax is less than the threshold value δ and sorts the image into the person image. To the threshold value δ, 0.2 meters (m), for example, is set. Here, in the case where at least one of z_obj and z_lmax is multiple, the image sort part 325 calculates differences of all of the combinations of z_obj and z_lmax and determines that the images is the person image when an absolute value of any difference is less than the threshold value δ. Here, the local maximum distance is the distance corresponding to a region having an area larger than the surrounding region in the image and the fact that the value of the face detection distance is close to the value of the local maximum distance means that a person occupies a relatively large portion of the image. The image in which a person occupies a relatively large portion is likely to be a person image. Accordingly, the image sort part 325 can definitely sort the image into the person image or not depending on a degree of closeness between the values of the face detection distance and the local maximum distance.

The image sort part 325 sorts, in the case where the image is the person image, the person image into the portrait image when the number of the face regions is less than a predetermined number (e.g., 3) and sorts the person image into the group image when the number of the face regions is equal to or more than the predetermined number.

The image sort part 325 determines that the image is the landscape image when an absolute value of the difference is equal to or more than the threshold value δ and sorts the image into the landscape image. When the sorted image is the image belonging to the image type that the user designates, the image sort part 325 outputs a title and a thumbnail of the image as the search result to the display part 190. Note that, the image sort part 325 is an example of a determination part in the appended claims of the present disclosure. Alternatively, the image sort part 325 may output the sorting result of the image to the display part 190.

Data File Structure

FIG. 3 is a diagram illustrating an example of a data structure of a data file according to the first embodiment. The data file is created under the Exif standards. In the data file, a start of image (SOI), an application marker segment 1 (APP1), a define quantization table (DQT) and a define Huffman table (DHT) are sequentially stored. Then, following a start of frame header (SOF) and a start of scan header (SOS), a main body of compressed data is stored and an end of image (EOI) is stored. The compressed data is the image data compressed in accordance with a compression format such as JPEG standards. Then, the depth data created in the image processing device 300 is stored next to the end of image (EOI). Note that, though the image processing device 300 stores the depth data next to the EOI of the Exif standards, the depth data may be stored in the other region as long as the depth data can be associated with the image data.

The APP1 is an area in which Exif attachment information is stored. In the APP1, an APP1 length is defined after an APP1 marker. Subsequently, after an Exif identifier code, a TIFF header, a principal image IFD (0th IFD), a principal image IFD value (0th IFD value) and the like are stored.

Figure 4:
FIG. 4 is a diagram illustrating an example of an image sorted into a portrait image according to the first embodiment.

FIG. 4 is an example of an image 510 to be sorted into the portrait image according to the first embodiment. A single person occupies a relatively large portion at around the center of the image 510 and the landscape such as clouds and the horizontal line occupies the background portion. Because the person occupying the image is the single person, one face region is detected. Because a specific person is shot as a major subject, the image 510 is the portrait image.

Figure 5:
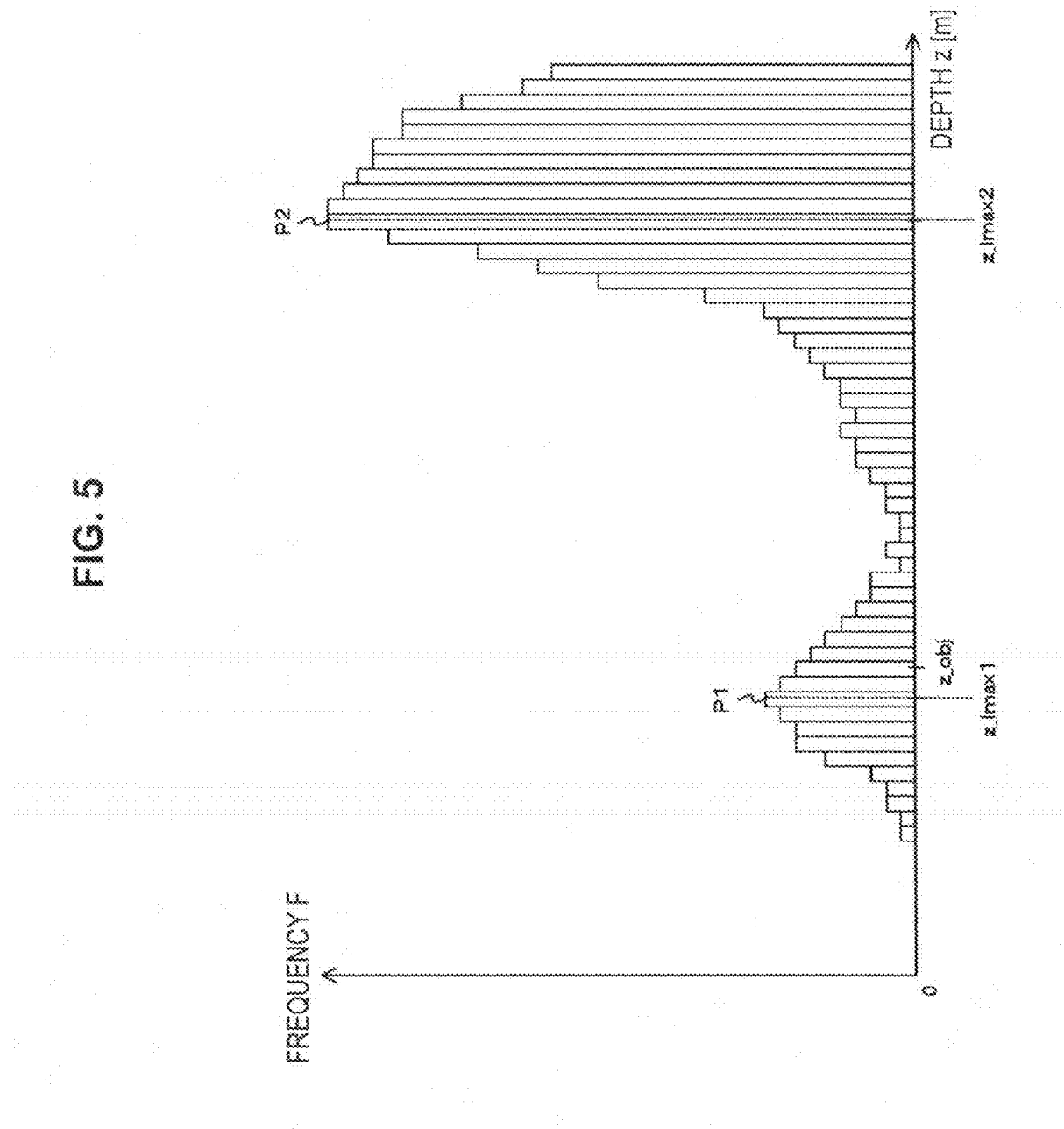
FIG. 5 is a graph illustrating an example of a depth frequency distribution of the image sorted into the portrait image according to the first embodiment.

FIG. 5 is a graph illustrating an example of a depth frequency distribution of the image 510 to be sorted into the portrait image according to the first embodiment. In the figure, a histogram is created in which a horizontal axis represents the depth z and a vertical axis represents the frequency F, and an amplitude of the frequency F is represented as a height of a bar with respect to each depth z. In this histogram, there are two local maximum points P1 and P2 where the frequencies F are local maximums, and the depths corresponding to those points are selected as a local maximum distance z_lmax1 and a local maximum distance z_lmax2, respectively. An absolute value of a difference between the local maximum distance z_lmax1 and the face detection distance z_obj is smaller than the threshold value δ. Besides, one face region is detected from the image 510 as described above. For this reason, the image processing device 300 sorts the image 510 generating the histogram into the portrait image.

As described above, the image processing device 300 can definitely sort the image into the portrait image by determining whether the value of the local maximum distance and the value of the face detection distance are close to each other and the number of the face regions is less than the predetermined number. This is because a few specific persons generally occupy a relatively large portion as major subjects in the portrait image, and as a result, the number of the face regions is few and it often happens that the value of the face detection distance z_obj and the value of the local maximum distance z_lmax become close to each other.

Figure 6:
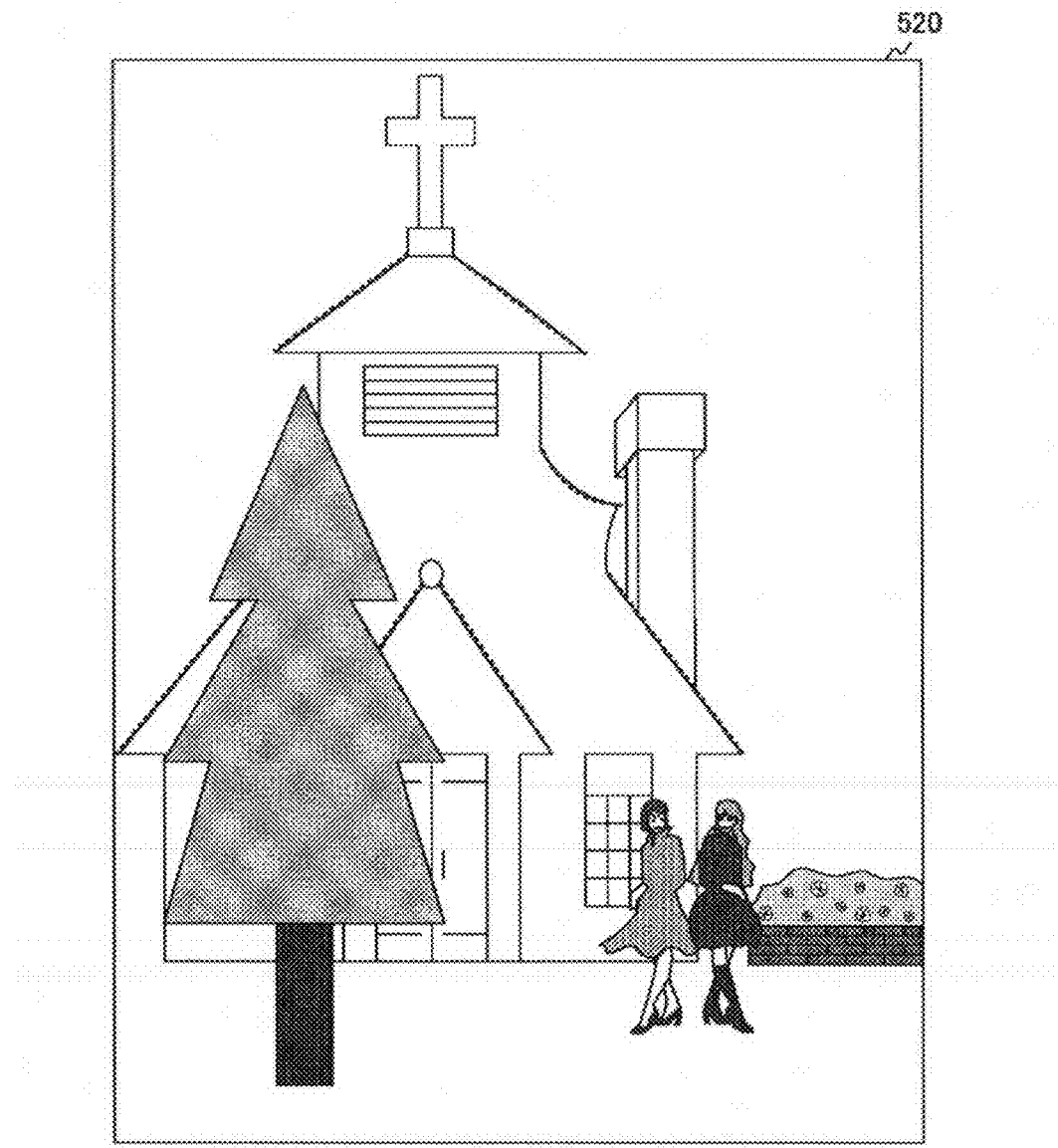
FIG. 6 is a diagram illustrating an example of an image sorted into a landscape image according to the first embodiment.

FIG. 6 is an example of an image 520 to be sorted into the landscape image according to the first embodiment. A building occupies a relatively large portion at around the center of this image 520. Near the building, persons occupy a smaller portion in comparison with the portion of the building. Because the landscape is shot as the main subject, the image 520 is the landscape image.

Figure 7:
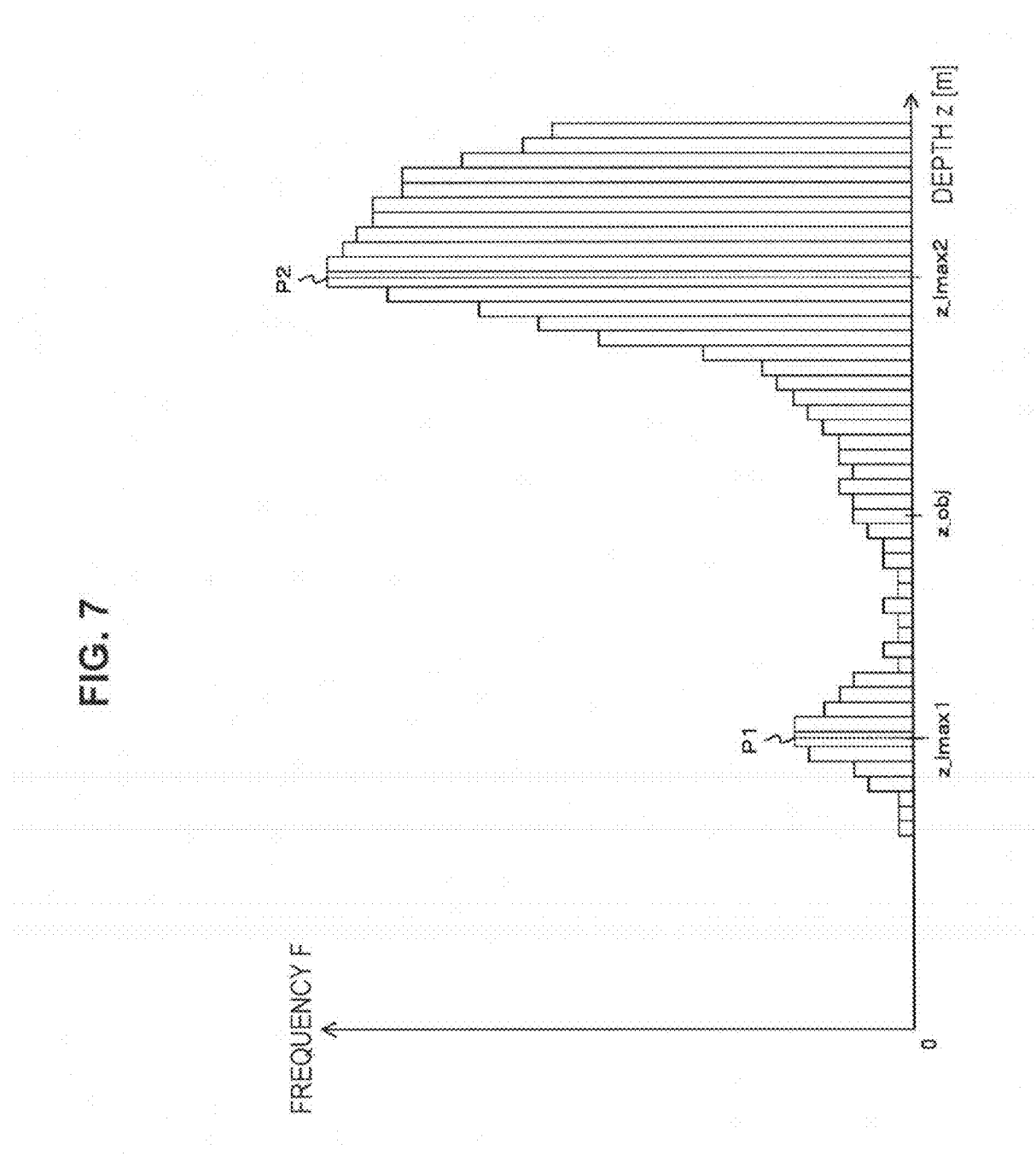
FIG. 7 is a graph illustrating an example of a depth frequency distribution of the image sorted into the landscape image according to the first embodiment.

FIG. 7 is a graph illustrating an example of the depth frequency distribution in the image 520 to be sorted into the landscape image according to the first embodiment. In the figure, a histogram is created in which a horizontal axis represents the depth z and a vertical axis represents the frequency F, and an amplitude of the frequency F is represented as a height of a bar with respect to each depth z. In this histogram, there are two local maximum points P1 and P2 where the frequencies F are local maximums, and the depths corresponding to those points are selected as a local maximum distance z_lmax1 and a local maximum distance z_lmax2, respectively. An absolute value of a difference between the local maximum distance z_lmax1 and the face detection distance z_obj is equal to or more than the threshold value δ. For this reason, the image processing device 300 sorts the image 520 represented as such histogram into the landscape image.

As described above, the image processing device 300 can definitely sort the image into the landscape image by determining whether the value of the local maximum distance and the value of the face detection distance are close to each other. This is because, though a person occupies a certain portion of the landscape image, the portion is smaller than the portion of the surrounding landscape and it often happens that an absolute value of the difference between the value of the face detection distance z_obj and the value of the local maximum distance z_lmax becomes larger.

Figure 8:
FIG. 8 is a diagram illustrating an example of an image sorted into a group image according to the first embodiment.

FIG. 8 is an example of an image 530 to be sorted into the group image according to the first embodiment. A plurality of gathered persons occupies certain portions of the image 530, respectively. Because the persons occupying the certain portions are three persons and more, three face regions and more are detected. Because gathered persons are shot as major subjects, the image 530 is the group image.

Figure 9:
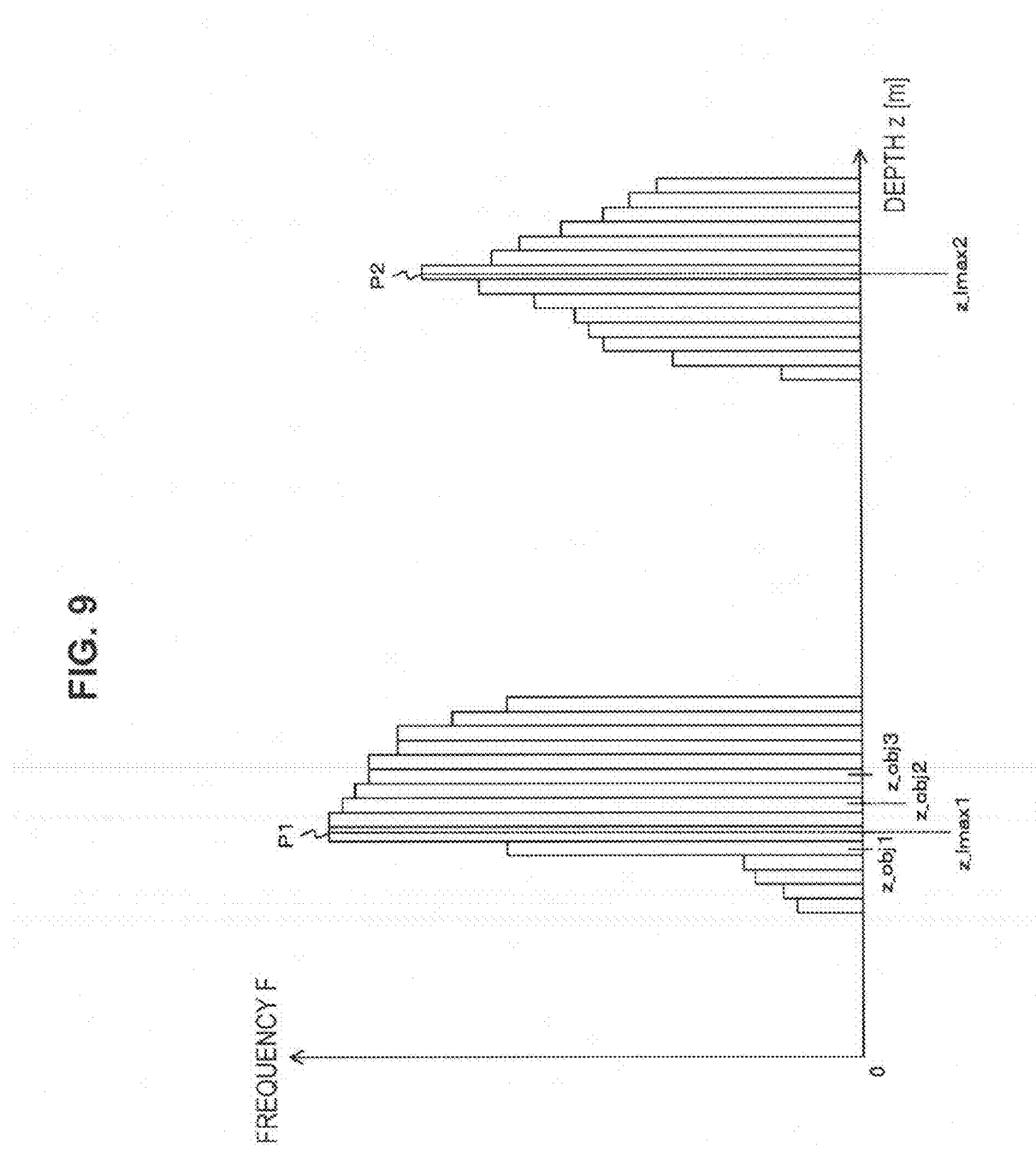
FIG. 9 is a graph illustrating an example of a depth frequency distribution of the image sorted into the group image according to the first embodiment.

FIG. 9 is a graph illustrating an example of the depth frequency distribution of the image 530 to be sorted into the group image according to the first embodiment. In the figure, a histogram is created in which a horizontal axis represents the depth z and a vertical axis represents the frequency F, and an amplitude of the frequency F is represented as a height of a bar with respect to each depth z. In this histogram, there are two local maximum points P1 and P2 where the frequencies F are local maximums, and the depths corresponding to those points are selected as a local maximum distance z_lmax1 and a local maximum distance z_lmax2, respectively. Because three persons and more occupy the certain portions, a number of face detection distances including the face detection distances from z_obj1 to z_obj3 are selected. Each of absolute values of respective differences with the local maximum distances from z_lmax1 to z_lmax3 is smaller than the threshold value δ. Besides, the plurality of face regions is detected from the image 530 as described above. For this reason, the image processing device 300 sorts the image 530 represented as such histogram into the group image.

As described above, the image processing device 300 can definitely sort the image into the group image by determining whether the value of the local maximum distance and the value of the face detection distance are close to each other and the number of the face regions is equal to or more than the predetermined number. This is because a number of persons generally occupy a relatively large portion as major subjects in the group image, and as a result, the number of the detected face regions is large and it often happens that the value of the face detection distance z_obj and the value of the local maximum distance z_lmax become close to each other.

Image Processing Device Operation Example

Figure 10:
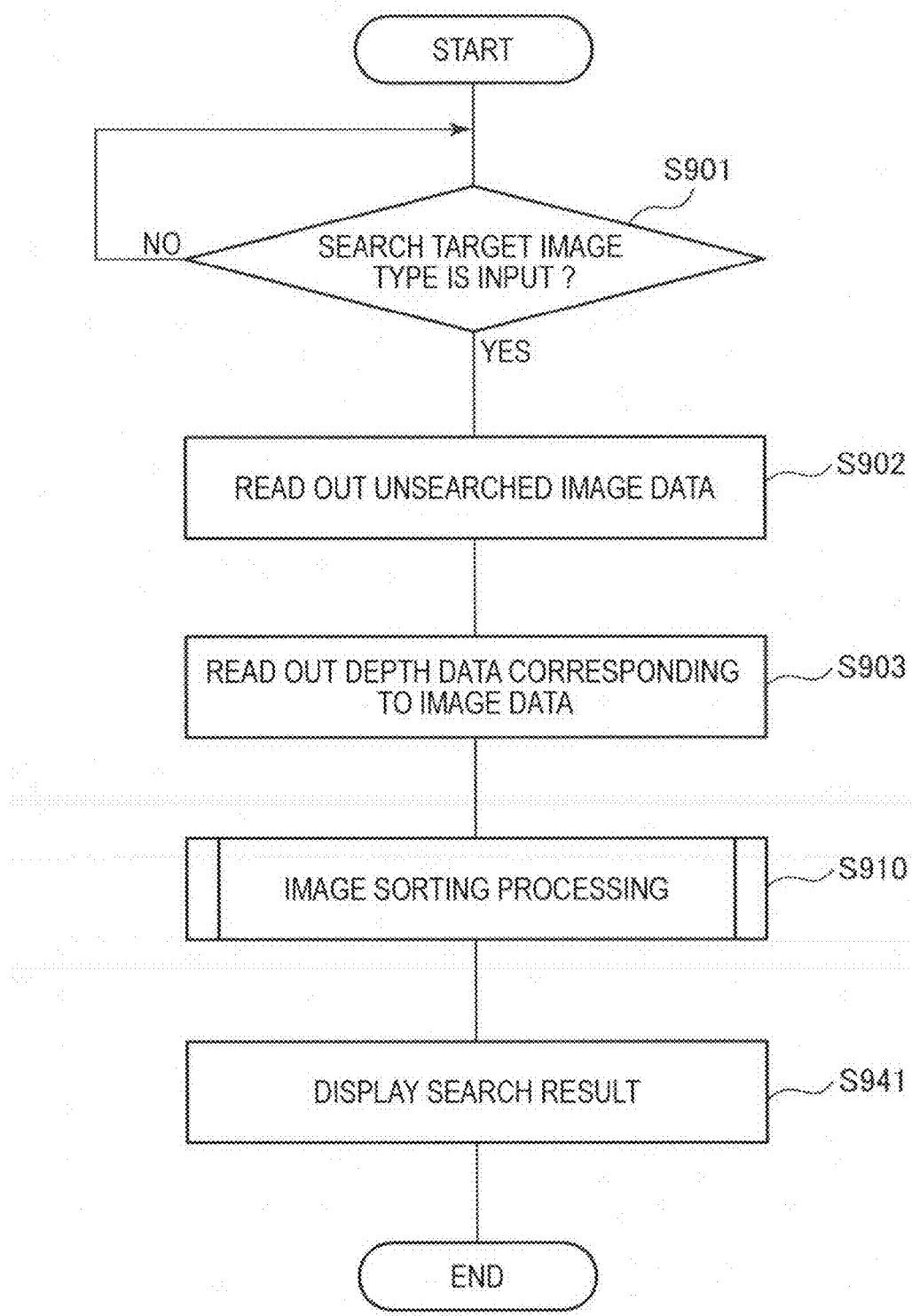
FIG. 10 is a flowchart illustrating an operation example of the image processing device according to the first embodiment.

FIG. 10 is a flowchart illustrating an operation example of the image processing device 300 according to the first embodiment. This operation starts when, for example, processing for image searching is performed. The image processing device 300 determines whether an image type of a searching target is input (step S901). When the image type is not input (step S901: No), the image processing device 300 returns to step S901.

When the image type is input (step S901: Yes), the image processing device 300 reads out unsearched image data from the image data storage part 180 (step S902). Also the image processing device 300 reads out depth data corresponding to the read out image data from the image data storage part 180 (step S903). The image processing device 300 performs image sorting processing sorting an image based on the local maximum distance z_lmax and the face detection distance z_obj (step S910). The image processing device 300 displays the search result of the image based on the sorting result of the image (step S941). After performing step S941, the image processing device 300 terminates the operation for image searching.

Figure 11:
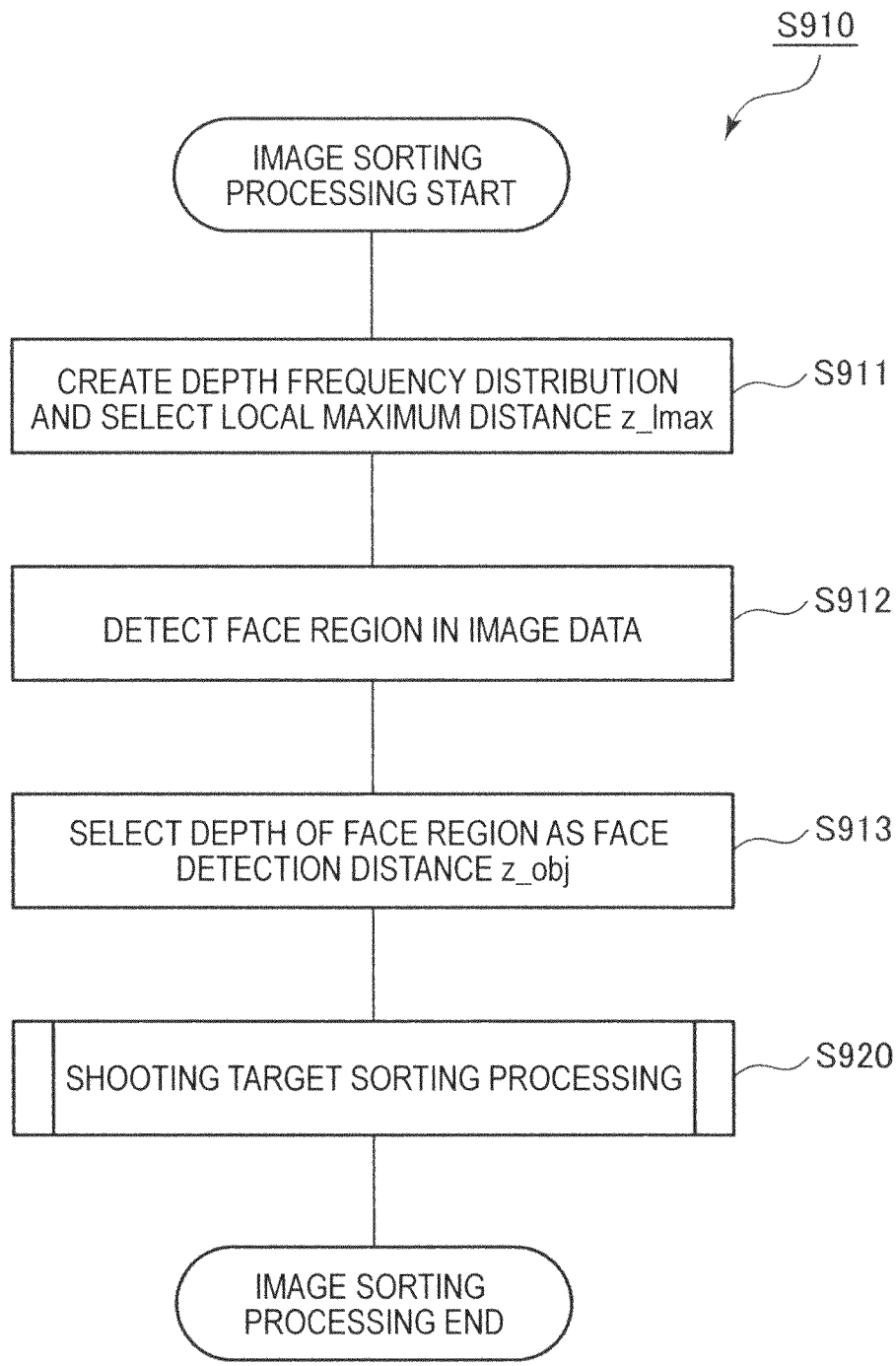
FIG. 11 is a flowchart illustrating an example of image sorting processing according to the first embodiment.

FIG. 11 is a flowchart illustrating an example of the image sorting processing according to the first embodiment. The image processing device 300 creates a depth frequency distribution and selects a depth having a local maximum frequency in the depth frequency distribution as a local maximum distance z_lmax (step S911). In addition, the image processing device 300 detects a face region in the image data (step S912). The image processing device 300 selects a depth corresponding to a pixel included in the face region as a face detection distance z_obj (step S913). The image processing device 300 performs shooting target sorting processing sorting an image focusing on a type of a shooting target (step S920). After performing step S920, the image processing device 300 terminates the image sorting processing.

Figure 12:
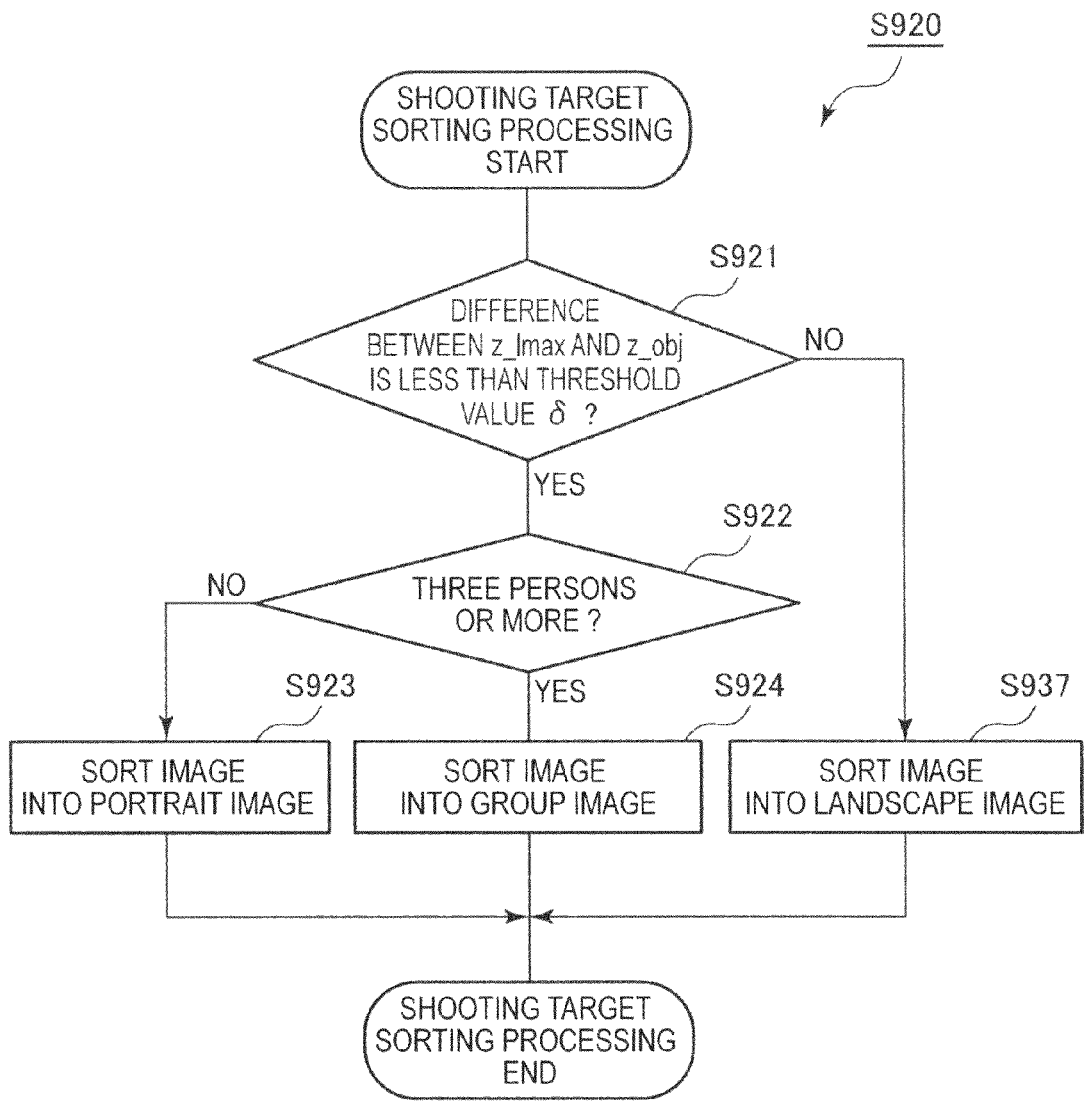
FIG. 12 is a flowchart illustrating an example of shooting target sorting processing according to the first embodiment.

FIG. 12 is a flowchart illustrating an example of the shooting target sorting processing according to the first embodiment. The image processing device 300 determines whether an absolute value of a difference between the local maximum distance z_lmax and the face detection distance z_obj is less than a threshold value δ (step S921). When the absolute value of the difference is less than the threshold value δ (step S921: Yes), the image processing device 300 sorts the image into the person image. In addition, the image processing device 300 determines whether the person image includes three persons or more (step S922). In the case where the person image includes less than three persons (step S922: No), the image processing device 300 sorts the person image into the portrait image (step S923). In the case where the person image includes three persons or more (step S922: Yes), the image processing device 300 sorts the person image into the group image (step S924).

In the case where the absolute value of the difference between the local maximum distance z_lmax and the face detection distance z_obj is more than or equal to threshold value δ (step S921: No), the image processing device 300 sorts the image into the landscape image (step S925). After performing steps S923, S924 or S925, the image processing device 300 terminates the shooting target sorting processing.

Figure 13A:
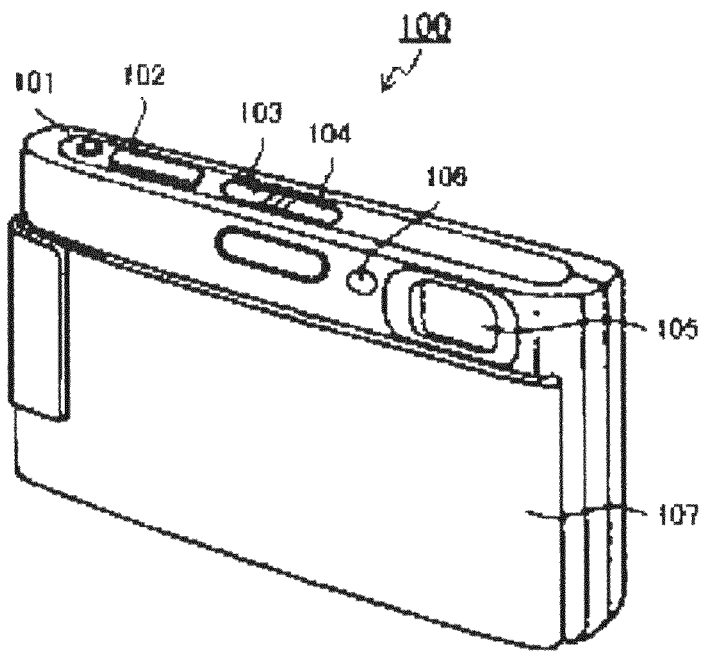
FIG. 13A and FIG. 13B are overall views illustrating a configuration example of the image pickup apparatus according to the first embodiment.
Figure 13B:
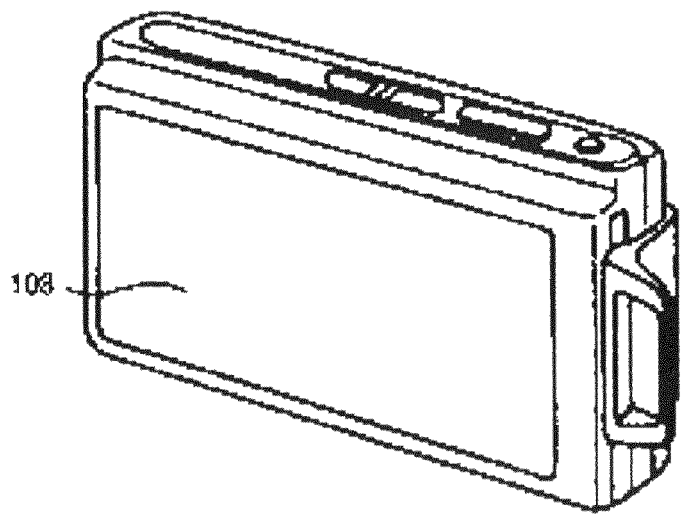

FIGS. 13A, 13B are overall views illustrating a configuration example of the image pickup apparatus 100 according to the first embodiment. FIG. 13A illustrates an example of a top face and a front face of the image pickup apparatus 100 and FIG. 13B illustrates an example of a back face of the image pickup apparatus 100. On the top face of the image pickup apparatus 100, a zoom lever 101, a shutter button 102, a play button 103 and a power button 104 are provided. On the front face of the image pickup apparatus 100, a shooting lens 105, an AF (Auto Focus) illuminator 106 and a lens cover 107 are provided. On the back face of the image pickup apparatus 100, a touch screen 108 is provided.

The zoom lever 101 is a lever for performing a zoom control operation. The shutter button 102 is a button for shooting photos of a subject. The play button 103 is a button for displaying image data. The power button 104 is a button for powering on or off the image pickup apparatus 100. The shooting lens 105 is the lens for shooting an image. The AF illuminator 106 emits light when an autofocus function is activated. The lens cover 107 is a component movable to a position to cover the shooting lens 105 for protecting the shooting lens 105. The touch screen 108 is a display enabling operations of the image pickup apparatus 100 by touch of a finger or the like.

The operation part 110 illustrated in FIG. 1 includes the zoom lever 101, the shutter button 102, the play button 103 and the power button 104 illustrated in FIG. 13A. The operation part 110 and the display part 190 illustrated in FIG. 1 includes the touch screen 108 illustrated in FIG. 13B.

As described above, according to the first embodiment of the present technology, the image processing device 300 can definitely sort the image based on the depth by determining whether the image is the person image depending on whether the degree of closeness in the values of the face detection distance and the local maximum distance is higher than the predetermined value. Accordingly, the image processing device 300 can definitely sort the image even in the case where a person occupies a certain portion of the landscape image.

Note that, thought the image processing device 300 detects the region of the person face, the image processing device 300 may detect a region of a target object such as an animal face and a predetermined object other than the person face. In this case, the image processing device 300 sorts the image into a target object image obtained by shooting a target object when the values of the local maximum distance and the detection distance of the target object are close to each other.

Alternatively, though the image processing device 300 further sorts the person image into the portrait image or the group image, the image processing device 300 may not sort the person image into the portrait image or the group image.

2. Second Embodiment

Image Processing Device Operation Example

A second embodiment of the present technology will be described with reference to FIG. 14 through FIG. 20. A configuration of an image pickup apparatus 100 according to the second embodiment is similar to that of the image pickup apparatus 100 according to the first embodiment illustrated in FIG. 1. A configuration of an image processing device 300 according to the second embodiment is similar to that of the image processing device 300 according to the first embodiment illustrated in FIG. 2. Note that, unlike the first embodiment, the image processing device 300 according to the second embodiment further performs shooting distance sorting processing in the case where the face region is not detected in the image sorting processing. The shooting distance sorting processing is the processing sorting the image focusing on a shooting distance, and in particular, the shooting distance sorting processing is the processing determining whether the image is the macro image depending on whether the value of the local maximum distance is less than a threshold value z_nth. Here, the threshold value z_nth is a predetermined real number and 0.5 meters (m) is set, for example.

Figure 14:
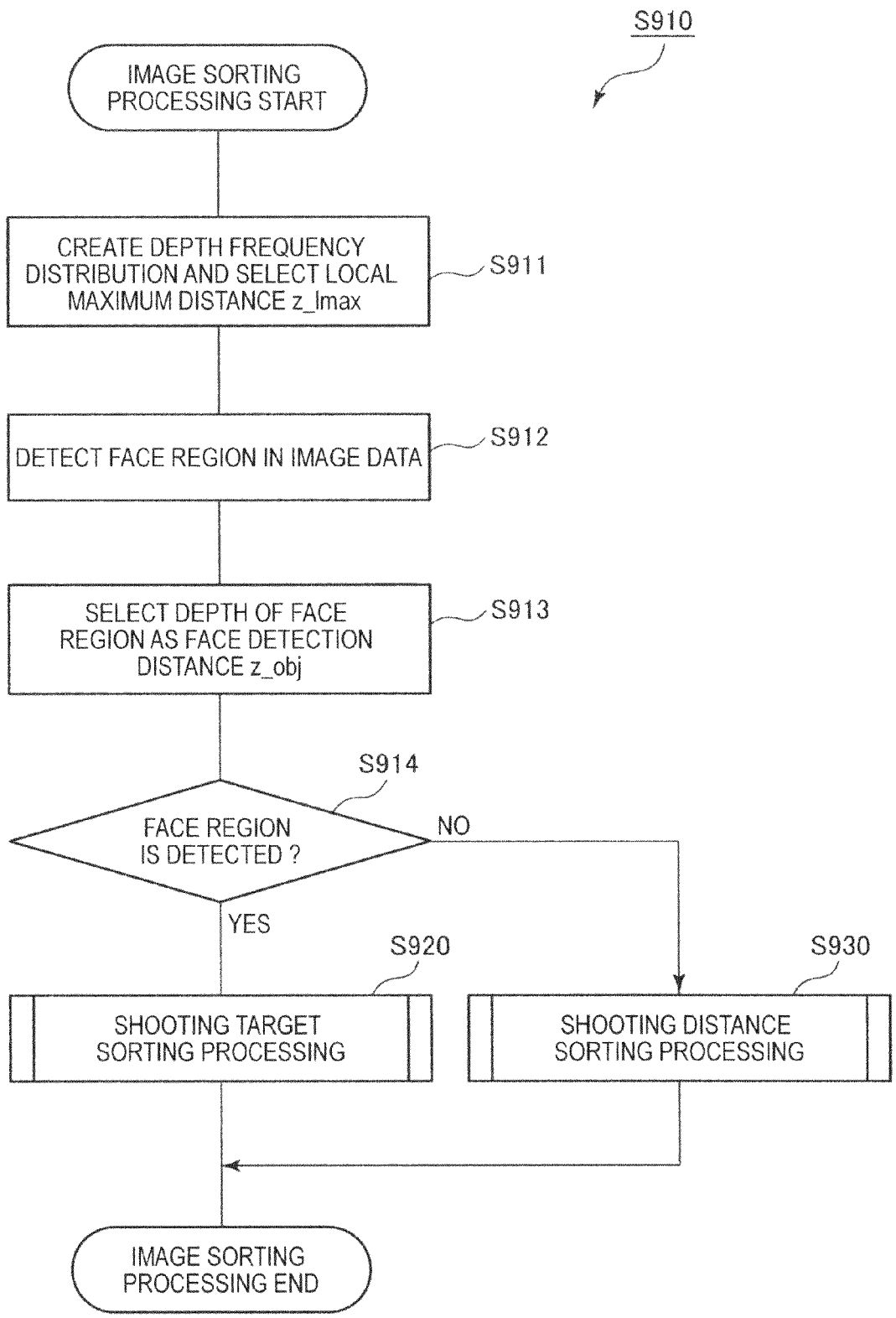
FIG. 14 is a flowchart illustrating an example of image sorting processing according to a second embodiment.

FIG. 14 is a flowchart illustrating an example of the image sorting processing according to the second embodiment. Unlike the first embodiment, the image processing device 300 according to the second embodiment further performs the shooting distance sorting processing in the case where the face region is not detected in the image sorting processing. After selecting the face detection distance (step S913), the image processing device 300 determines whether the face region is detected (step S914). In the case where the face region is detected (step S914: Yes), the image processing device 300 performs the shooting target sorting processing (step S920). In the case where the face region is not detected (step S914: No), the image processing device 300 performs the shooting distance sorting processing that is the processing sorting the image focusing on the shooting distance (step S930). After performing step S920 or step S930, the image processing device 300 terminates the image sorting processing.

Figure 15:
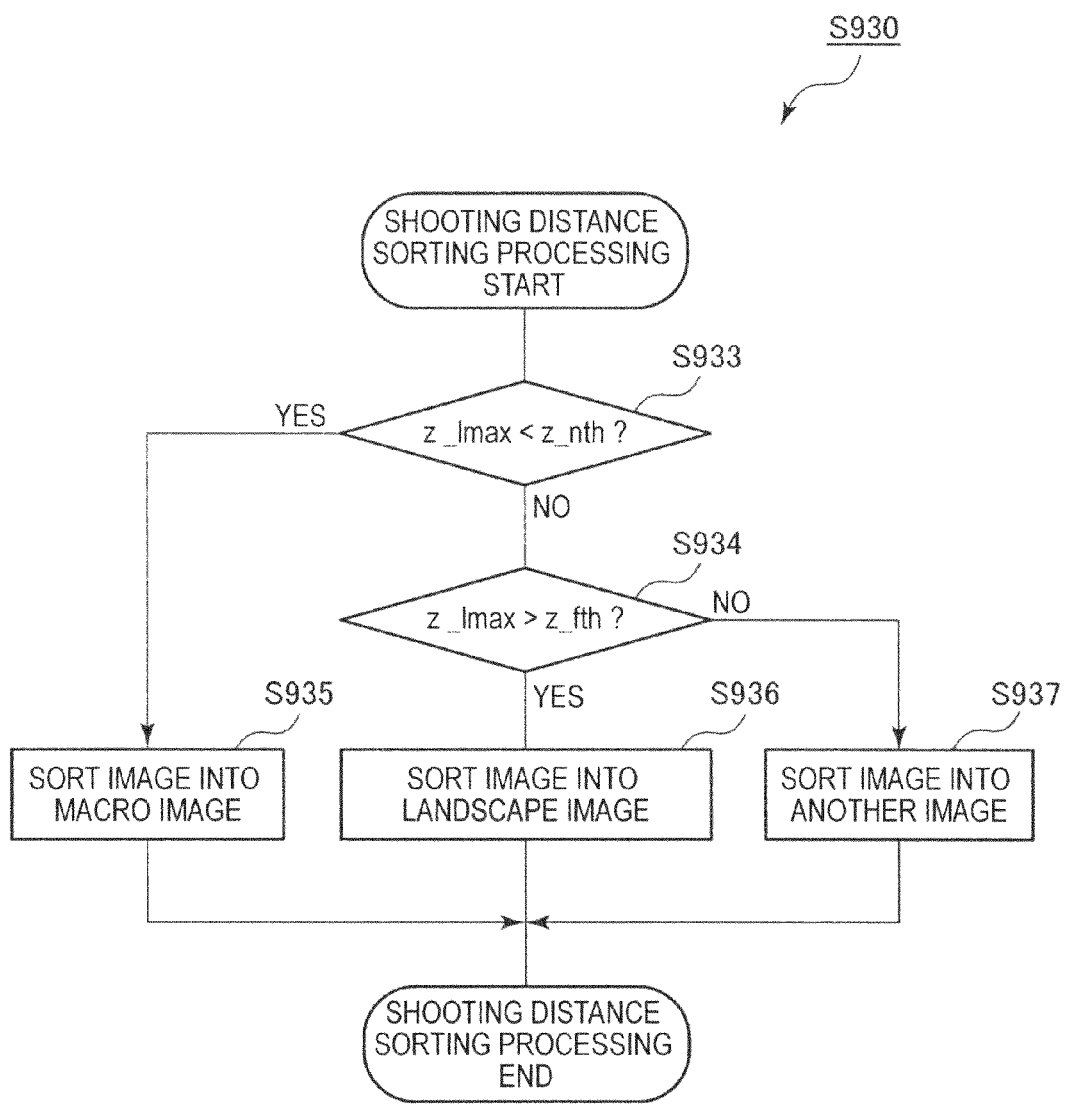
FIG. 15 is a flowchart illustrating an example of shooting distance sorting processing according to the second embodiment.

FIG. 15 is a flowchart illustrating an example of the shooting distance sorting processing according to the second embodiment. The image processing device 300 determines whether the local maximum distance z_lmax is less than the threshold value z_nth (step S933). Note that, in the case where a plurality of local maximum distances z_lmax is selected, the image processing device 300 compares the local maximum distance z_lmax of the local maximum point having the largest frequency F with the threshold value z_nth.

In the case where the local maximum distance z_lmax is equal to or more than the threshold value z_nth (step S933: No), the image processing device 300 determines whether the local maximum distance z_lmax is more than a threshold value z_fth (step S934). To the threshold value z_fth, a real number (e.g., 10 meters) more than the threshold value z_nth is set.

In the case where the local maximum distance z_lmax is less than the threshold value z_nth (step S933: Yes), the image processing device 300 sorts the image into the macro image (step S935). In the case where the local maximum distance z_lmax is more than the threshold value z_fth (step S934: Yes), the image processing device 300 sorts the image into the landscape image (step S936). In the case where the local maximum distance z_lmax is less than or equal to the threshold value z_fth (step S934: No), the image processing device 300 sorts the image into another image (step S937). After performing step S935, S936 or S937, the image processing device 300 terminates the shooting distance sorting processing.

Figure 16:
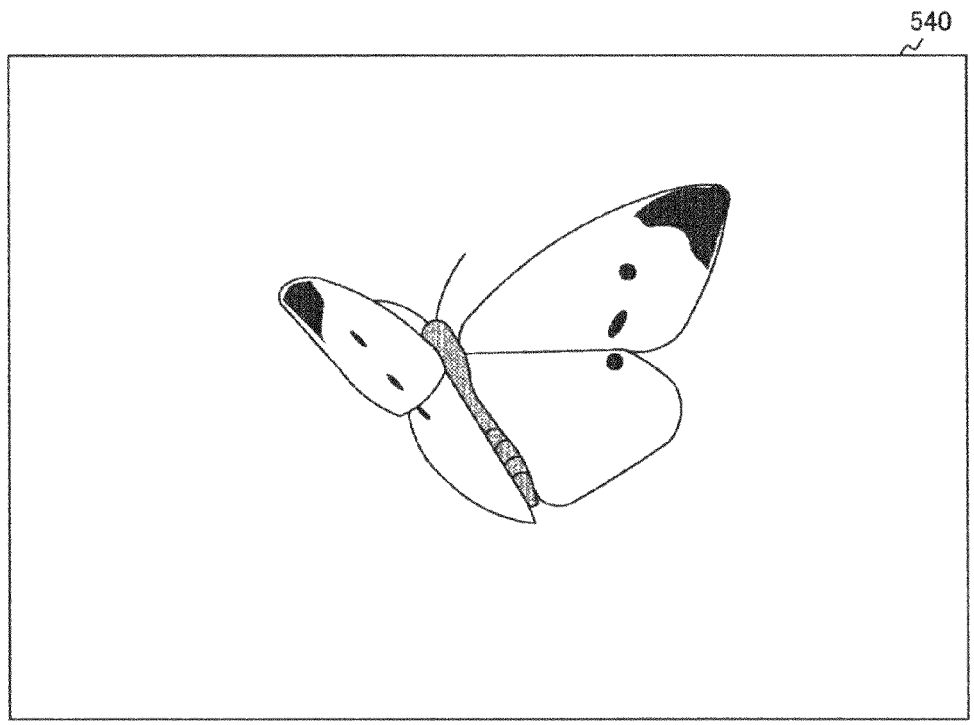
FIG. 16 is a diagram illustrating an example of an image sorted into a macro image according to the second embodiment.

FIG. 16 is an example of an image 540 to be sorted into the macro image according to the second embodiment. An insect shot from up-close occupies a certain portion at around the center of the image 540. Because no person occupies a portion of the image 540, the face region is not detected. Because the close-in subject is shot as a major subject, the image 540 is the macro image.

Figure 17:
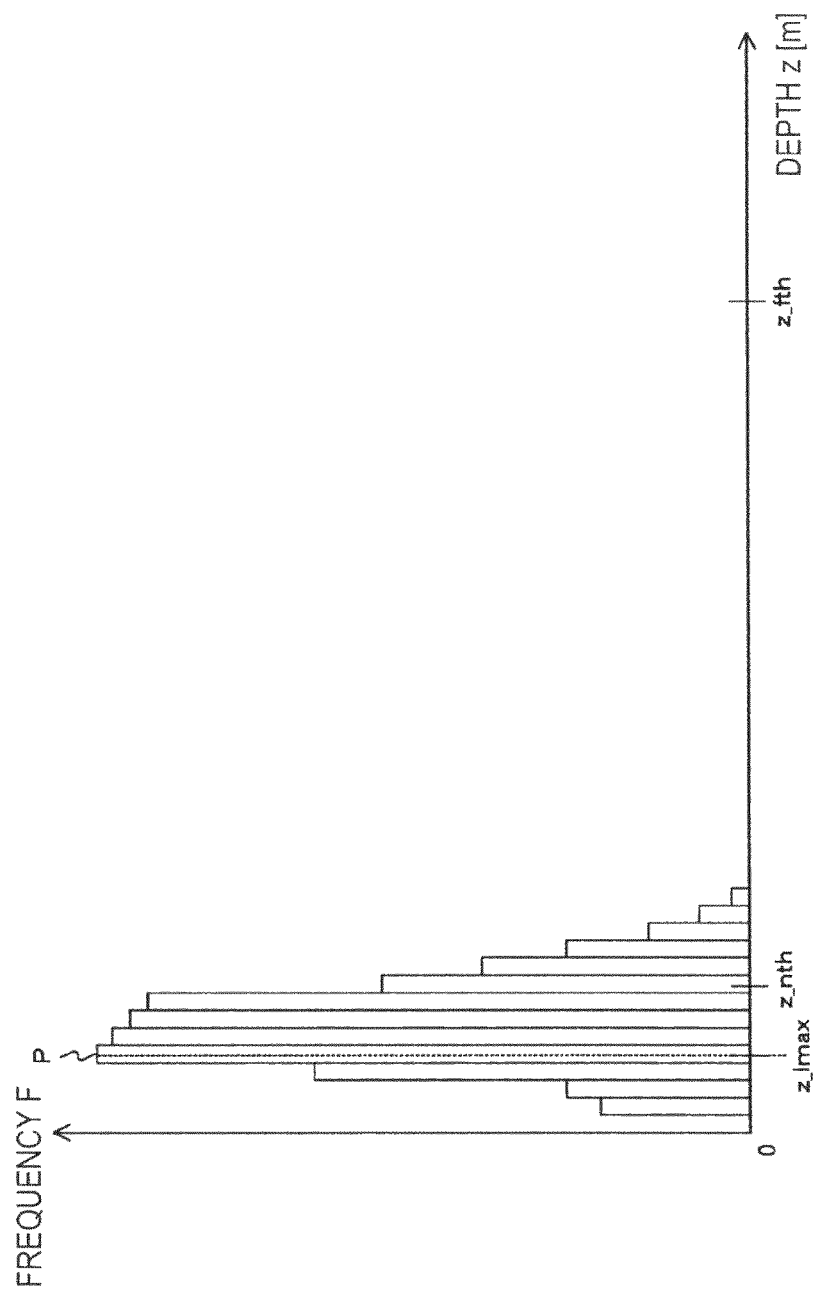
FIG. 17 is a graph illustrating an example of a depth frequency distribution of the image sorted into the macro image according to the second embodiment.

FIG. 17 is a graph illustrating an example of the depth frequency distribution of the image 540 sorted into the macro image according to the second embodiment. In the figure, a histogram is created in which a horizontal axis represents the depth z and a vertical axis represents the frequency F, and an amplitude of the frequency F is represented as a height of a bar with respect to each depth z. In this histogram, the depth corresponding to the local maximum point P where the frequency F is a local maximum is selected as a local maximum distance z_lmax. The value of the local maximum distance z_lmax1 is less than the threshold value z_nth. Besides, the face region is not detected from the image 540 as described above. For this reason, the image processing device 300 sorts the image 540 represented as such histogram into the macro image.

As described above, the image processing device 300 can definitely sort the image into the macro image by determining whether the value of the local maximum distance is less than the threshold value and whether the face regions is detected. This is because the subject shot from up-close other than a person generally occupies a relatively large portion in the macro image, and as a result, the face region is not detected and it often happens that the value of the local maximum distance z_lmax becomes smaller.

Figure 18:
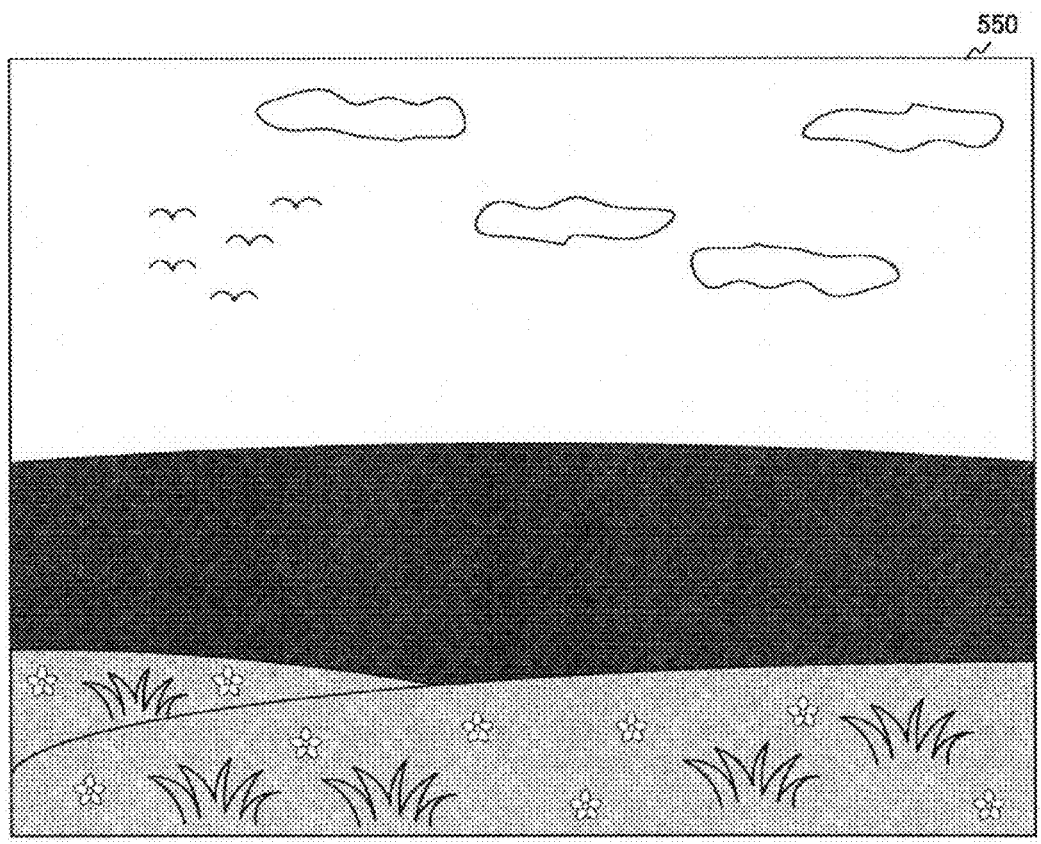
FIG. 18 is a diagram illustrating an example of an image sorted into a landscape image according to the second embodiment.

FIG. 18 is an example of an image 550 to be sorted into the landscape image according to the second embodiment. A long-distance landscape such as clouds and the horizontal line occupies a certain portion of the image 550. Because the landscape is shot as the major subject, the image 550 is the landscape image.

Figure 19:
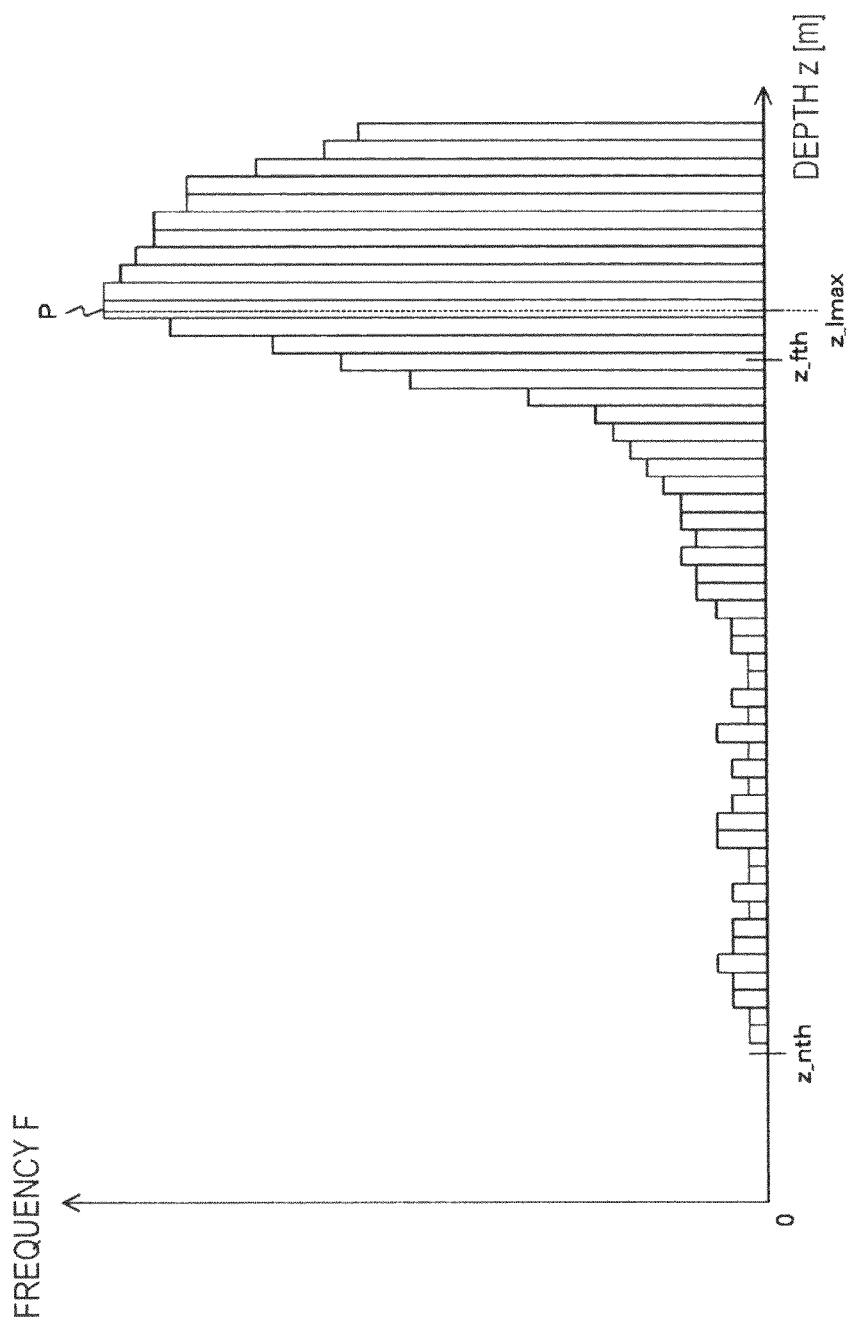
FIG. 19 is a graph illustrating an example of a depth frequency distribution of the image sorted into the landscape image according to the second embodiment.

FIG. 19 is a graph illustrating an example of the depth frequency distribution of the image 550 sorted into the landscape image according to the second embodiment. In the figure, a histogram is created in which a horizontal axis represents the depth z and a vertical axis represents the frequency F, and an amplitude of the frequency F is represented as a height of a bar with respect to each depth z. In this histogram, the depth corresponding to the local maximum point P where the frequency F is a local maximum is selected as a local maximum distance z_lmax. The value of the local maximum distance z_lmax is more than the threshold value z_fth. For this reason, the image processing device 300 sorts the image 550 represented as such histogram into the landscape image.

The image processing device 300 can definitely sort the image into the landscape image by determining whether the value of the local maximum distance is more than the threshold value. This is because the long-distance landscape generally occupies the certain portion of the landscape image as the major subject, it often happens that the value of the local maximum distance z_lmax becomes larger.

As described above, according to the second embodiment of the present technology, the image processing device 300 can definitely sort the image into the macro image or the person image depending on the magnitude of the value of the local maximum distance and the degree of closeness between the value of the face detection distance and the value of the local maximum distance.

Modification Example

Figure 20:
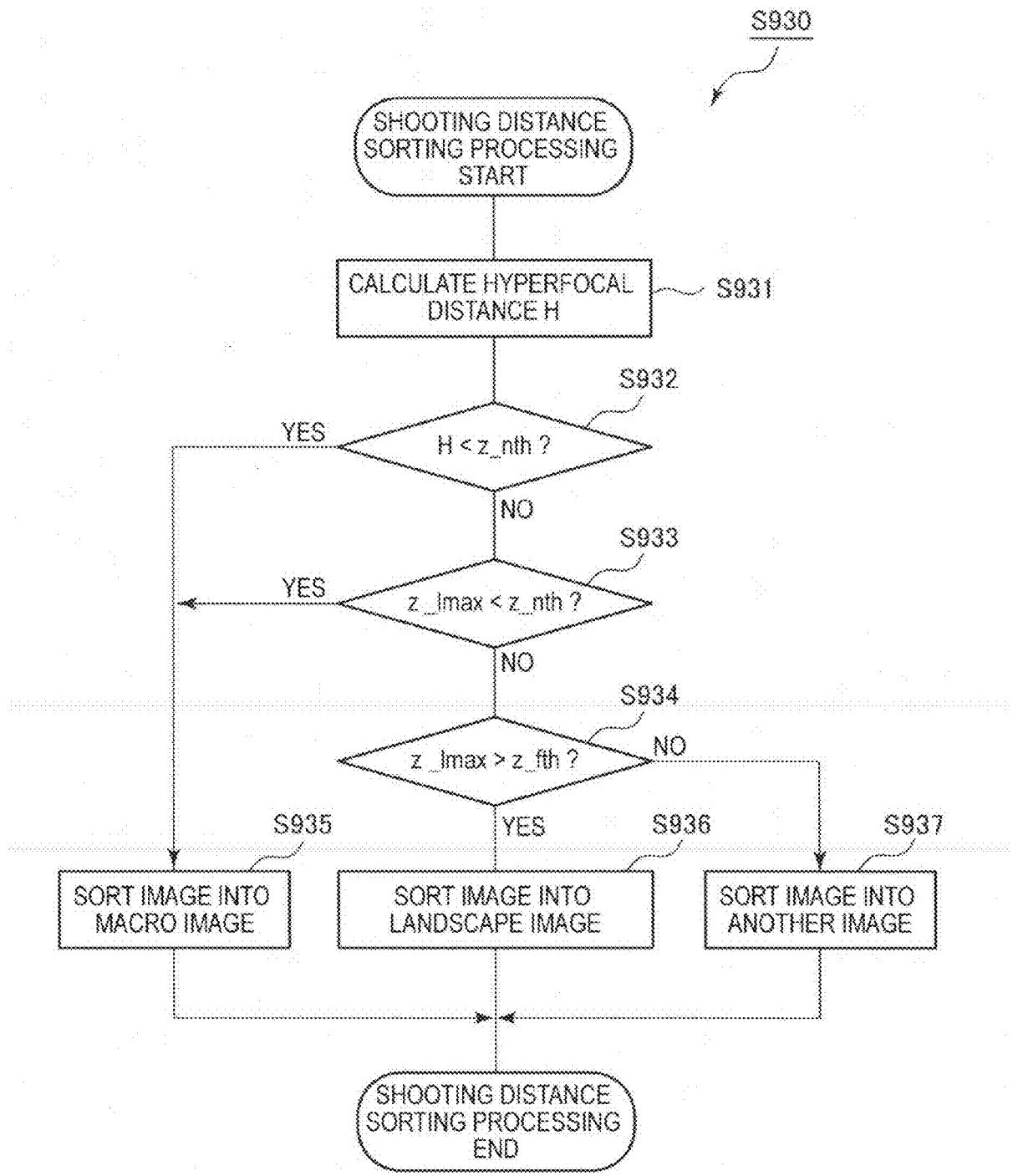
FIG. 20 is a flowchart illustrating an example of shooting distance sorting processing according to a modification example of the second embodiment.

A modification example according to the second embodiment will be described with reference to FIG. 20. FIG. 20 is a flowchart illustrating an example of shooting distance sorting processing according to a first modification example. Unlike the second embodiment, the image processing device 300 determines that the image is the macro image even in the case where a value of a hyperfocal distance H is smaller than a threshold value in the shooting distance sorting processing of the present modification example. Here, the hyperfocal distance H is the distance at which a depth of field extends in a range from H/2 to infinity in the case where a subject at the distance H is focused. In the case where the value of the hyperfocal distance H is less than the threshold value z_nth, it is assumed that the subject at the distance below the threshold value is shot in focus. Accordingly, the image processing device 300 can determine that the image is the macro image.

In the shooting distance sorting processing, the image processing device 300 calculates the hyperfocal distance H (step S931). The value of the hyperfocal distance H is calculated by the following formula 1, for example. In the following formula 1, N represents an aperture value, and c represents a diameter of a permissible circle of confusion in which bokeh is permissible in the image. H and c are measured in meters (m), for example.

$$H = f^2/(Nc) \qquad \text{Formula 1}$$

The image processing device 300 determines whether the value of the hyperfocal distance H is less than the threshold value z_nth (step S932). In the case where the value of the hyperfocal distance H is less than the threshold value z_nth (step S932: Yes), the image processing device 300 sorts the image into the macro image (step S935). In the case where the value of the hyperfocal distance H is equal to or more than the threshold value z_nth (step S932: No), the image processing device 300 determines whether the value of the local maximum distance z_lmax is less than the threshold value z_nth (step S933). The processing steps after step S933 are similar to those in the second embodiment.

As descried above, according to the modification example of the second embodiment, the image processing device 300 can determine that the image is the macro image in the case where the value of the hyperfocal distance or of the local maximum distance is less than the threshold value. That is, the image processing device 300 can sort the image in which a subject shot from up-close occupies a relatively large portion or the image focused on a close-in subject into the macro image.

3. Third Embodiment

Image Processing Device Configuration Example

Figure 21:
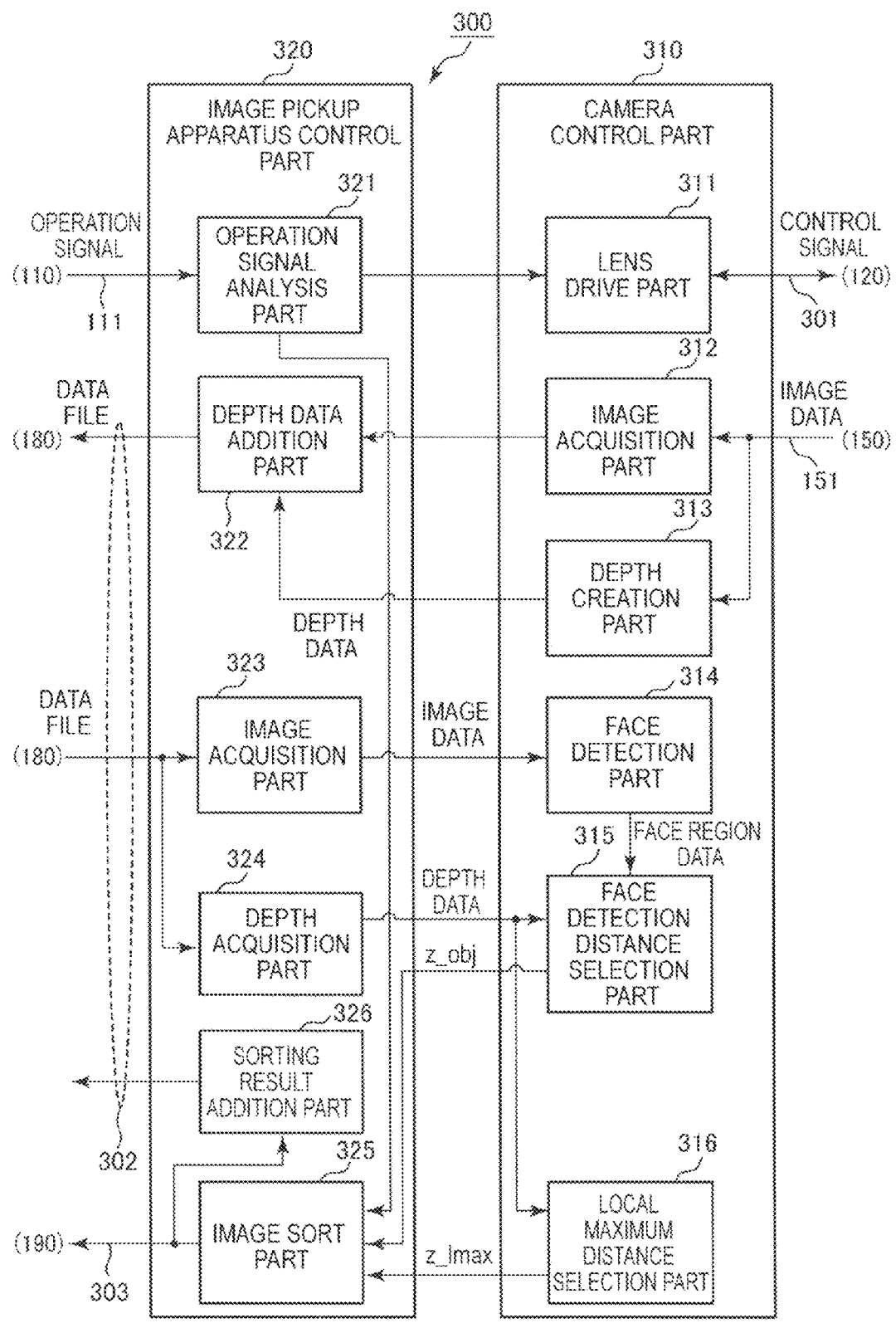
FIG. 21 is a diagram illustrating a configuration example of an image processing device according to a third embodiment.

A third embodiment of the present technology will be described with reference to FIG. 21 through FIG. 24. A configuration of an image pickup apparatus 100 according to the third embodiment is similar to the configuration of the image pickup apparatus 100 according to the first embodiment illustrated in FIG. 1. FIG. 21 is a block diagram illustrating a configuration example of the image processing device 300 according to the third embodiment. Unlike the first embodiment, the image processing device 300 according to the third embodiment further includes a sorting result addition part 326 in the image pickup apparatus control part 320. An image sort part 325 of the third embodiment outputs a sorting result further to a sorting result addition part 326.

The sorting result addition part 326 stores the sorting result obtained by the image sort part 325 in the image data storage part 180 in association with the image data. The sorting result addition part 326 associates both by adding the sorting result as a tag under Exif standard, for example, to the image data. Note that, the sorting result addition part 326 is an example of a recording part in the appended claims of the present disclosure.

Besides, a face detection distance selection part 315 and a local maximum distance selection part 316 of the third embodiment do not perform selection of a face detection distance and a local maximum distance in the case where the sorting result is added to the image data. Similarly, the image sort part 325 does not perform sorting of the image in the case where the sorting result is added to the image data but performs searching by utilizing the added sorting result.

Data File Structure

Figure 22:
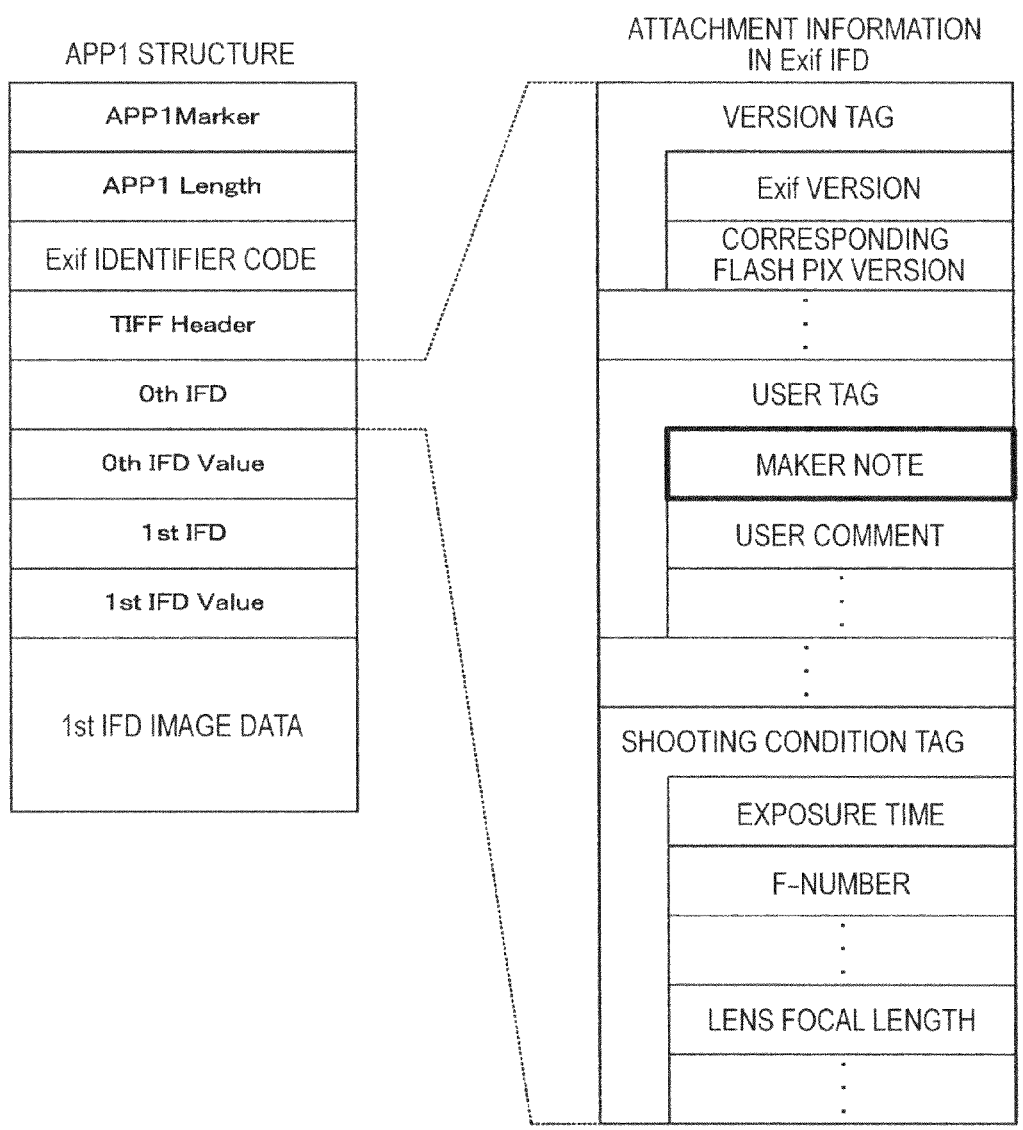
FIG. 22 is a diagram illustrating an example of a data structure of attachment information according to the third embodiment.

FIG. 22 is a diagram illustrating an example of a data structure of attachment information in a data file according to the third embodiment. The attachment information (tag) of the image data is stored in the 0th IFD in the application marker segment 1 (APP1). The attachment information is segmented into a version tag, a user information tag, a shooting condition tag and the like. The version tag includes an Exif version and a corresponding flash pix version. The user information tag includes a maker note, a user comment and the like. The shooting condition tag includes an exposure time, F-number, the focal distance of the lens and the like. The sorting result addition part 326 stores the sorting result in a region of the maker note, for example.

Image Processing Device Operation Example

Figure 23:
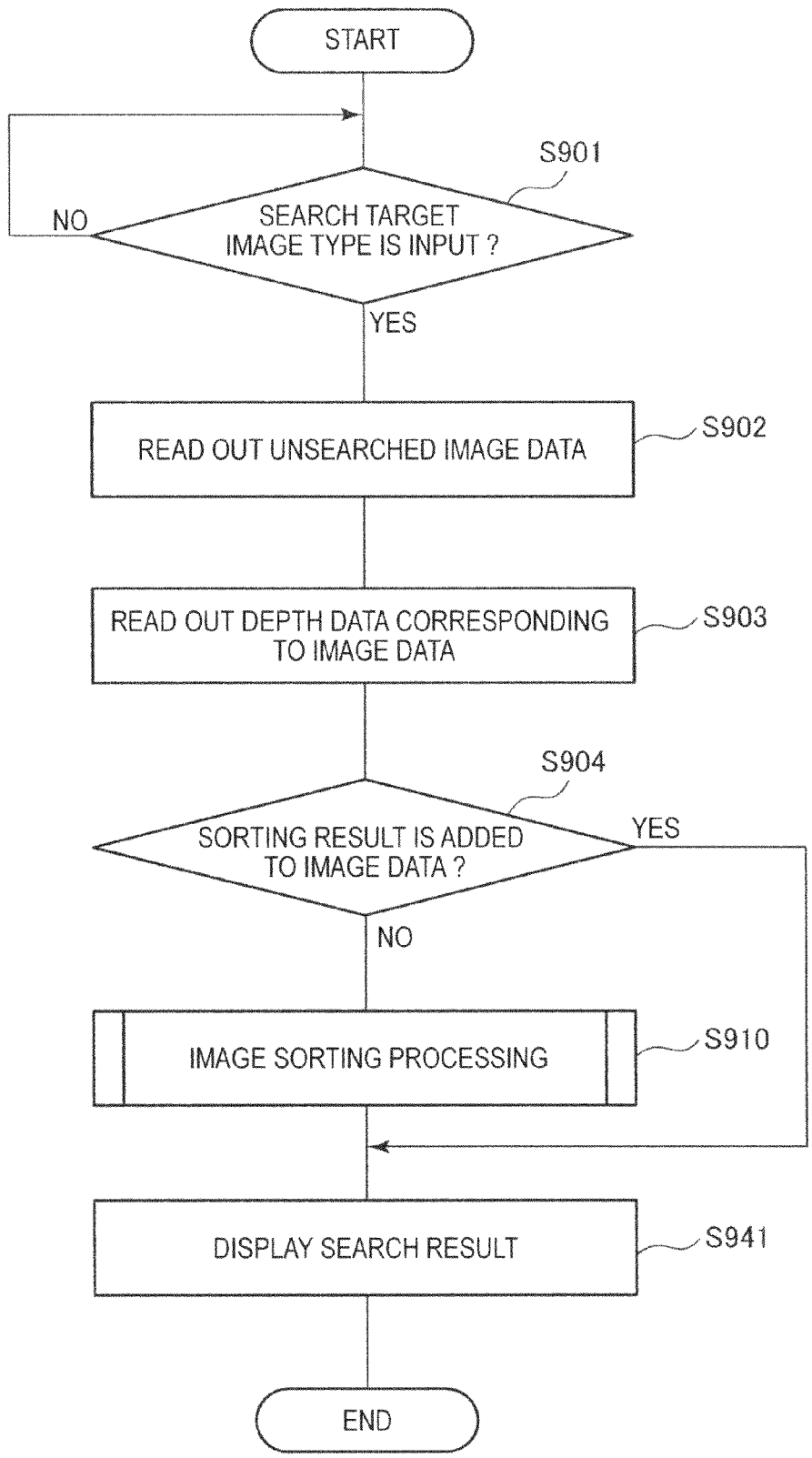
FIG. 23 is a flowchart illustrating an operation example of the image processing device according to the third embodiment.

FIG. 23 is a flowchart illustrating an operation example of the image processing device 300 according to the third embodiment. Unlike the operation performed in the first embodiment, the image processing device 300 according to the third embodiment further performs step S904.

After reading out depth data corresponding to the image data (step S903), the image processing device 300 determines whether the sorting result is added to the image data (step S904). In the case where the sorting result is not added to the image data (step S904: No), the image processing device 300 performs the mage sorting processing (step S910). In the case where the sorting result is added to the image data (step S904: Yes) or after performing step S910, the image processing device 300 displays the search result (step S941).

Figure 24:
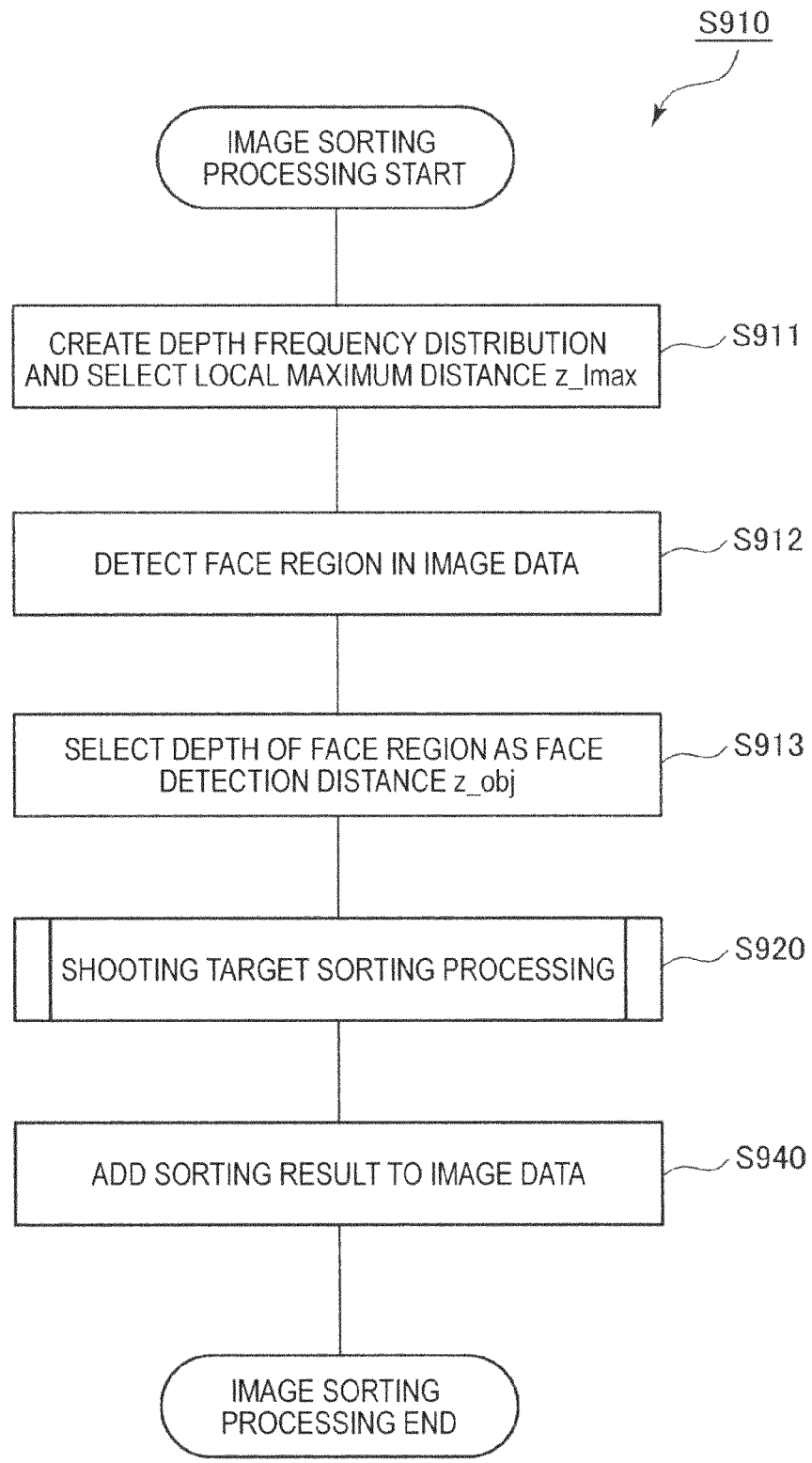
FIG. 24 is a flowchart illustrating an example of image sorting processing according to the third embodiment.

FIG. 24 is a flowchart illustrating an example of the image sorting processing according to the third embodiment. Unlike the first embodiment, step S940 is further performed in the image sorting processing according to the third embodiment. The image processing device 300 performs the shooting target sorting processing (step S920) and subsequently adds the sorting result to the image data (step S940). After performing step S940, the image processing device 300 terminates the image sorting processing.

As described above, according to the third embodiment, the image processing device 300 sorts the image and associates the sorting result with the image in the case like searching of the image where the image sorting processing is necessary, so that the image processing device 300 can omit subsequent sorting processing supposed to be necessary.

4. Fourth Embodiment

Image Processing Device Configuration Example

Figure 25:
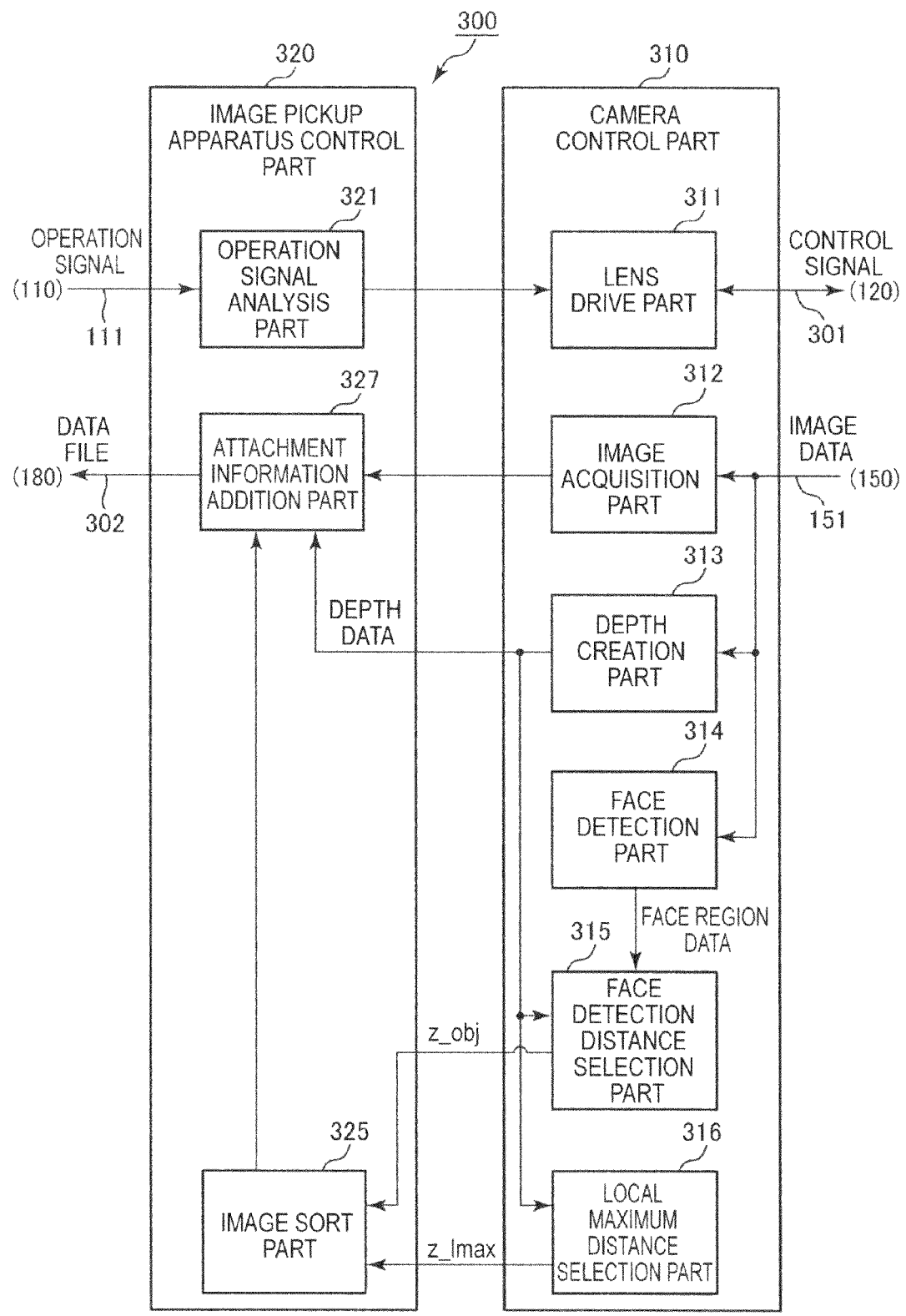
FIG. 25 is a block diagram illustrating a configuration example of an image processing device according to a fourth embodiment.

A fourth embodiment of the present technology will be described with reference to FIG. 25 and FIG. 26. Unlike the third embodiment, an image processing device 300 according to the fourth embodiment relates the sorting result to the image data not after but before storing the image data. FIG. 25 is a block diagram illustrating a configuration example of the image processing device 300 according to the fourth embodiment. Unlike the third embodiment, the image processing device 300 according to the fourth embodiment includes an attachment information addition part 327 instead of the depth data addition part 322, the image acquisition part 323, the depth acquisition part 324 and the sorting result addition part 326. The attachment information addition part 327 stores the image data by adding the depth data and the sorting result to the image data. An image acquisition part 312 of the fourth embodiment outputs the image data to the attachment information addition part 327. A depth creation part 313 of the fourth embodiment outputs depth data to the attachment information addition part 327, a face detection distance selection part 315 and a local maximum distance selection part 316. A face detection part 314 of the fourth embodiment detects a face region in the image data output from an A/D conversion part 150.

Image Processing Device Operation Example

Figure 26:
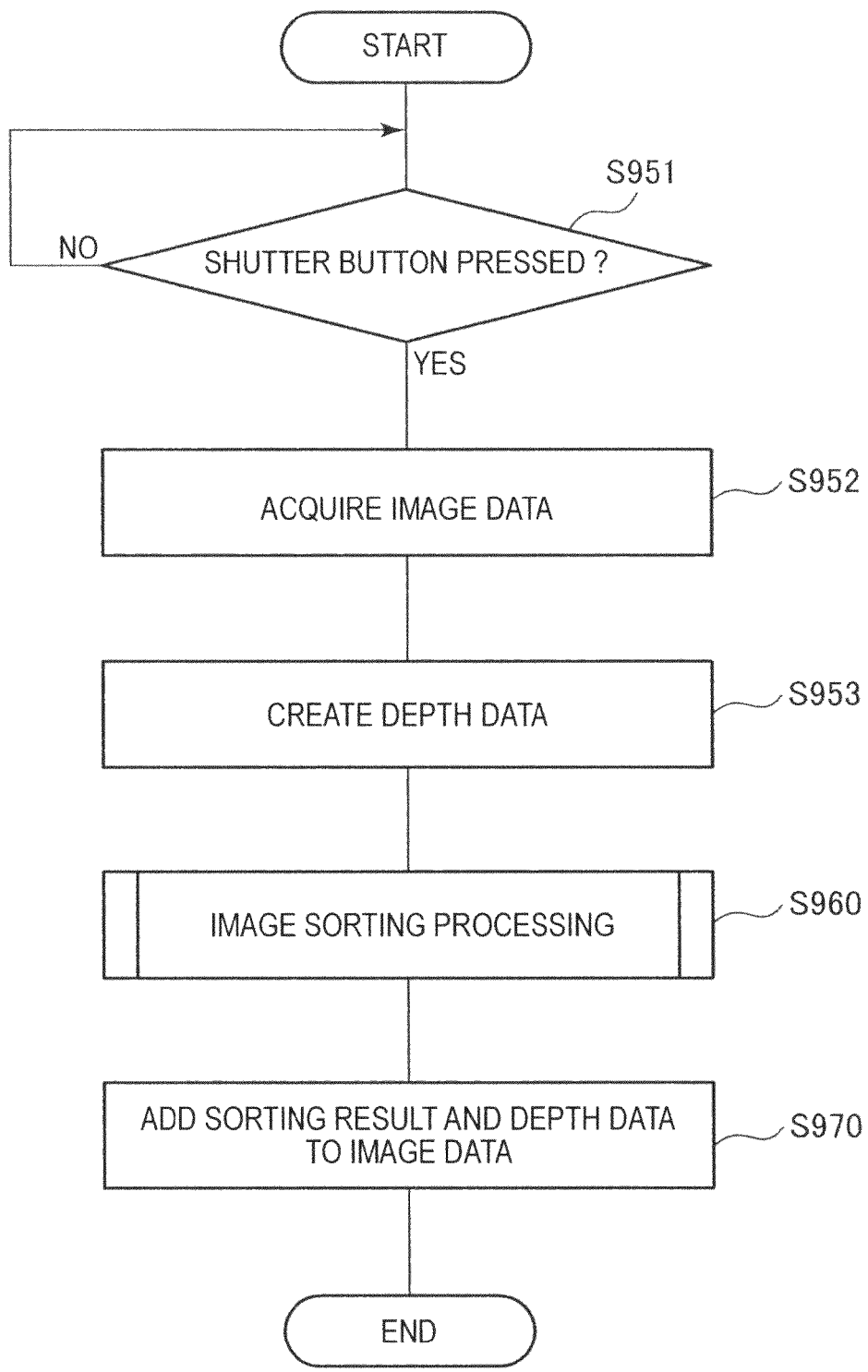
FIG. 26 is a flowchart illustrating an operation example of the image processing device according to the fourth embodiment.

FIG. 26 is a flowchart illustrating an operation example of the image processing device 300 according to the fourth embodiment. This operation starts when, for example, processing for shooting a subject is performed. The image processing device 300 determines whether the shutter button is pressed (step S951). When the shutter button is not pressed (step S951: No), the image processing device 300 returns to step S951.

When the shutter button is pressed (step S951: Yes), the image processing device 300 acquires image data from the A/D conversion part 150 (step S952). The image processing device 300 creates a depth in association with a pixel included in the image data (step S953). Then, the image processing device 300 performs image sorting processing (step S960). The image sorting processing (step S960) according to the fourth embodiment is processing similar to the image sorting processing (step S910) according to the first embodiment illustrated in FIG. 11. The image processing device 300 store the image data in the image data storage part 180 by adding the sorting result and the depth data to the image data (step S970). After performing step S970, the image processing device 300 terminates the processing for shooting the subject.

As described above, according to the fourth embodiment, the image processing device 300 can omit the sorting processing of the image after storing the image data by associating the sorting result with the image data before storing the image data.

Note that, the image processing device 300 may add the selected local maximum distance to the image data instead of the sorting result in the third and the fourth embodiments. As a result, it becomes unnecessary for the image processing device that has read out the image data added the local maximum thereto distance to create the frequency distribution and select the local maximum distance. In addition, in the case where the image processing device 300 changes, after adding the local maximum distance, the contents of the image sorting processing and re-sorts the image, for example, it becomes unnecessary to select the local maximum distance. In particular, in the case where the image processing device 300 changes the threshold value δ, the threshold value z_nth or the threshold value z_fth and re-sorts the image, it becomes unnecessary to select the local maximum distance again.

The above-described embodiments indicate examples for embodying the present disclosure and matters according to the embodiments each have correspondence relation with claimed elements in the appended claims as explained below. Similarly, claimed elements in the appended claims each have corresponding relation with matters according to the embodiments of the present technology having the same name. However, the present disclosure is not limited to the embodiments. Various modifications can be applied to embody the present disclosure without departing from the spirit of the present disclosure.

Further, the above-described procedures in the above embodiments may be regarded as a method having the series of procedures or as a program causing a computer to execute the series of procedures and as a storage medium storing the program. The storage medium may include CD (Compact Disc), MD (MiniDisc), DVD (Digital Versatile Disk), a memory card, a Blu-ray Disc (R), a nonvolatile memory such as a flash memory and the like.

Additionally, the present technology may also be configured as below.

(1) An image processing device comprising:
  an image acquisition part acquiring an image;
  a depth acquisition part acquiring a depth in association with a pixel included in the image;
  a target object detection part detecting a region of a predetermined target object in the image;
  a target object detection distance selection part selecting the depth corresponding to the pixel included in the detected region as a target object detection distance;
  a local maximum distance selection part selecting the depth having a local maximum frequency in a frequency distribution of the depths as a local maximum distance; and
  a determination part determining whether the image is a target object image obtained by shooting the target object depending on whether a degree of closeness between a value of the target object detection distance and a value of the local maximum distance is higher than a predetermined value.

(2) The image processing device according to (1), wherein the target object detection part detects a face region of a person as the region of the target object, and
  the determination part determines that the image is a person image obtained by shooting the person in the case where the degree of closeness is higher than the predetermined value.

(3) The image processing device according to (2), wherein the determination part determines, in the case of determining that the image is the person image, that the person image is a portrait image obtained by shooting a particular person when the number of the detected face regions is less than a predetermined number, and determines that the person image is a group image obtained by shooting a plurality of gathered persons when the number of the detected face regions is equal to or more than the predetermined number.

(4) The image processing device according to any one of (1) to (3), wherein the determination part determines that the image is the target object image in the case where the degree of closeness is higher than the predetermined value and determines that the image is a landscape image obtained by shooting a landscape in the case where the degree of closeness is equal to or lower than the predetermined value.

(5) The image processing device according to any one of (1) to (4), further comprising a recording part storing a determination result performed by the determination part in association with the image.

(6) An image processing device comprising:
  an image acquisition part acquiring an image;
  a depth acquisition part acquiring a depth in association with a pixel included in the image;
  a target object detection part detecting a region of a predetermined target object in the image;
  a target object detection distance selection part selecting, in the case where the region of the target object is detected, the depth corresponding to the pixel included in the detected region as a target object detection distance;
  a local maximum distance selection part selecting the depth having a local maximum frequency in a frequency distribution of the depths as a local maximum distance; and
  a determination part determining, in the case where the target object detection distance is selected, whether the image is a target object image obtained by shooting the target object depending on whether a degree of closeness between a value of the target object detection distance and a value of the local maximum distance is higher than a predetermined value, and determining, in the case where the target object detection distance is not selected, whether the image is a macro image depending on whether a value of the local maximum distance is less than a threshold value.

(7) The image processing device according to (6), wherein the determination part determines, in the case where the target object detection distance is not selected, that the image is the macro image when a hyperfocal distance of an image pickup apparatus shooting the image or the value of the local maximum distance is less than the threshold value.

(8) A method of controlling an image processing device, comprising:
acquiring an image with an image acquisition part;
acquiring, with a depth acquisition part, a depth in association with a pixel included in the image;
detecting, with a target object detection part, a region of a predetermined target object in the image;
selecting, with a target object detection distance selection part, the depth corresponding to the pixel included in the detected region as a target object detection distance;
selecting, with a local maximum distance selection part, the depth having a local maximum frequency in a frequency distribution of the depths as a local maximum distance; and
determining, with a determination part, whether the image is a target object image obtained by shooting the target object depending on whether a degree of closeness between a value of the target object detection distance and a value of the local maximum distance is higher than a predetermined value.

(9) A program causing a computer to execute:
acquiring an image with an image acquisition part;
acquiring, with a depth acquisition part, a depth in association with a pixel included in the image;
detecting, with a target object detection part, a region of a predetermined target object in the image;
selecting, with a target object detection distance selection part, the depth corresponding to the pixel included in the detected region as a target object detection distance;
selecting, with a local maximum distance selection part, the depth having a local maximum frequency in a frequency distribution of the depths as a local maximum distance; and
determining, with a determination part, whether the image is a target object image obtained by shooting the target object depending on whether a degree of closeness between a value of the target object detection distance and a value of the local maximum distance is higher than a predetermined value.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-204032 filed in the Japan Patent Office on Sep. 20, 2011, the entire content of which is hereby incorporated by reference.

What is claimed is:

1. An information processing apparatus comprising:
circuitry configured to:
acquire depth data including depth information associated with a plurality of pixels included in image data of a captured image;
calculate a first depth having a local maximum frequency in a frequency distribution of the depth information, the frequency distribution of the depth information being generated based on the depth data;
calculate a second depth of an object included in a predetermined region of the captured image; and
determine whether the captured image is a target object image, a target of which is the object included in the predetermined region of the captured image, based on a difference in depths between the first depth and the second depth.

2. The information processing apparatus according to claim 1, wherein
the circuitry detects a face region of a person in the captured image as the predetermined region of the captured image, and
the circuitry determines that the captured image is a person image obtained by shooting the person in a case where the difference in depths is lower than a predetermined value.

3. The information processing apparatus according to claim 2, wherein the circuitry determines, in the case of determining that the captured image is the person image, that the person image is a portrait image obtained by shooting a particular person when a number of detected face regions is less than a predetermined number, and determines that the person image is a group image obtained by shooting a plurality of gathered persons when the number of detected face regions is equal to or more than the predetermined number.

4. The information processing apparatus according to claim 1, wherein the circuitry determines that the captured image is a landscape image obtained by shooting a landscape in a case where the difference in depth is equal to or lower than a predetermined value.

5. The information processing apparatus according to claim 1, wherein the circuitry is configured to store a determination result performed by the circuitry in association with the captured image.

6. The information processing apparatus according to claim 1, wherein the plurality of pixels represent all the pixels included in the image data of the captured image.

7. The information processing apparatus according to claim 1, wherein the depth data is stored with the image data.

8. The information processing apparatus according to claim 1, wherein
the circuitry is configured to:
calculate a third depth of another object included in another region of the captured image, and
determine whether the captured image is the target object image based on the difference in depth between the first depth and the second depth, and based on another difference in depths between the first depth and the third depth.

9. The information processing apparatus according to claim 1,
wherein the circuitry is configured to capture the captured image and store the image data.

10. The information processing apparatus according to claim 1, wherein the frequency distribution of the depth information indicates a frequency with respect to each depth for the plurality of pixels included in the image data.

11. A method of processing information, comprising:
acquiring depth data including depth information associated with a plurality of pixels included in image data of a captured image;
calculating a first depth having a local maximum frequency in a frequency distribution of the depth information, the frequency distribution of the depth information being generated based on the depth data;
calculating a second depth of an object included in a predetermined region of the captured image; and determining, using circuitry, whether the captured image is a target object image target of which is the object included in the predetermined region of the captured image, based on a difference in depths between the first depth and the second depth.

12. A non-transitory computer readable medium including executable instructions, which when executed by a computer cause the computer to execute a method of processing information, the method comprising:
   acquiring depth data including depth information associated with a plurality of pixels included in image data of a captured image;
   calculating a first depth having a local maximum frequency in a frequency distribution of the depth information, the frequency distribution of the depth information being generated based on the depth data;
   calculating a second depth of an object included in a predetermined region of the captured image; and
   determining whether the captured image is a target object image, a target of which is the object included in the predetermined region of the captured image, based on a difference in depth between the first depth and the second depth.

\* \* \* \* \*